(12) United States Patent
Edell et al.

(10) Patent No.: US 11,308,629 B2
(45) Date of Patent: Apr. 19, 2022

(54) TRAINING A NEURAL NETWORK TO TRACK VIEWER ENGAGEMENT WITH NON-INTERACTIVE DISPLAYS

(71) Applicant: ADOBE INC., San Jose, CA (US)

(72) Inventors: Max Gray Edell, Ottawa (CA); David E. Benge, Poulsbo, WA (US)

(73) Assignee: ADOBE INC., San Jose, CA (US)

(*) Notice: Subject to any disclaimer, the term of this patent is extended or adjusted under 35 U.S.C. 154(b) by 51 days.

(21) Appl. No.: 17/084,114

(22) Filed: Oct. 29, 2020

(65) Prior Publication Data

US 2021/0065378 A1    Mar. 4, 2021

Related U.S. Application Data

(62) Division of application No. 16/146,262, filed on Sep. 28, 2018, now Pat. No. 10,867,391.

(51) Int. Cl.
*G06T 7/00* (2017.01)
*G06T 7/20* (2017.01)
*G06F 3/01* (2006.01)
*G06N 3/08* (2006.01)
*G06K 9/00* (2022.01)
*G06N 5/04* (2006.01)

(52) U.S. Cl.
CPC ............... *G06T 7/20* (2013.01); *G06F 3/012* (2013.01); *G06F 3/013* (2013.01); *G06K 9/00228* (2013.01); *G06N 3/08* (2013.01); *G06N 5/046* (2013.01)

(58) Field of Classification Search
CPC . G06T 7/00; G06T 7/174; G06N 5/00; G06N 20/00; G06N 3/08; G06K 9/00; G06K 9/62; G06K 9/66
See application file for complete search history.

(56) References Cited

U.S. PATENT DOCUMENTS

| | | |
|---|---|---|
| 2011/0043759 A1 | 2/2011 | Bushinsky |
| 2013/0103624 A1 | 4/2013 | Thieberger |
| 2014/0026156 A1 | 1/2014 | Deephanphongs |
| 2014/0149177 A1* | 5/2014 | Frank ...................... G06F 40/30 705/7.29 |
| 2014/0344017 A1 | 11/2014 | Deephanphongs et al. |
| 2015/0341411 A1 | 11/2015 | Huber et al. |
| 2018/0300751 A1 | 10/2018 | Hammitt et al. |
| 2019/0102706 A1* | 4/2019 | Frank ................... G06K 9/6256 |
| 2020/0026919 A1 | 1/2020 | Boiko et al. |
| 2020/0143286 A1* | 5/2020 | Frank ....................... G06N 5/02 |
| 2020/0234079 A1* | 7/2020 | Minhas ................ G06K 9/6273 |

* cited by examiner

*Primary Examiner* — Li Liu
(74) *Attorney, Agent, or Firm* — Shook, Hardy & Bacon, L.L.P.

(57) ABSTRACT

Methods and systems are provided for training a neural network to track viewer engagement with a non-interactive display. Sensor data is obtained from one or more sensors, such as cameras, associated with a display device, and once a face is detected within the sensor data, a display sequence is initiated. The display sequence includes at least a first frame with a first visual feature and a second frame with a second visual feature. Using the sensor data obtained during presentation of the display sequence, viewer engagement with the sequence is tracked by determining eye movements and/or head movements. The detected eye movement and/or head movement is used to determine whether the person was actively engaged with the display sequence.

20 Claims, 17 Drawing Sheets

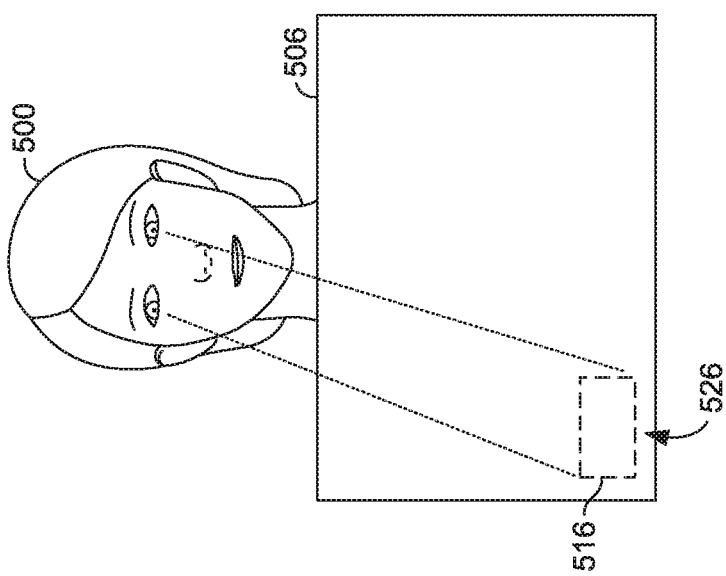
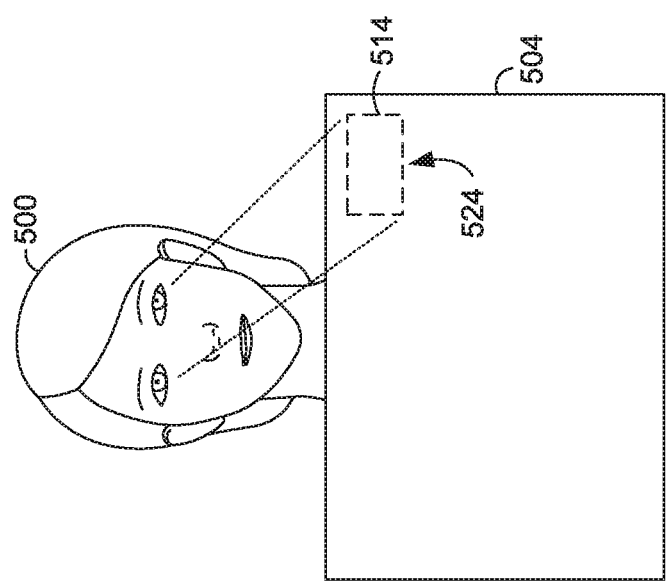
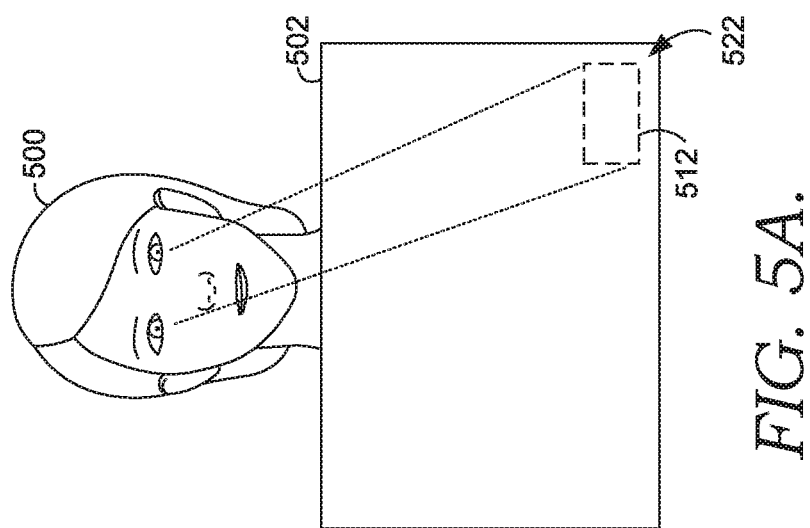

TRAINING A NEURAL NETWORK TO TRACK VIEWER ENGAGEMENT WITH NON-INTERACTIVE DISPLAYS

CROSS-REFERENCE TO RELATED APPLICATIONS

This application is a Division of U.S. patent application Ser. No. 16/146,262 filed Sep. 28, 2018 and titled "TRACKING VIEWER ENGAGEMENT WITH NON-INTERACTIVE DISPLAYS," the entire contents of which are incorporated by reference herein.

BACKGROUND

It is often useful to evaluate the effectiveness of an advertisement or marketing campaign and to compare the effectiveness of different campaigns. With online advertisements, a user's direct interactions, such as ad clicks, are used to test effectiveness. Similarly, advertisements on interactive displays can also be tested with direct user interactions, such as touches on the display. However, there are many scenarios, such as billboards or displays in retail settings, where an advertisement is not interactive but is still intended to engage the viewer. While these advertisements can be targeted to a demographic corresponding to a particular location in which the advertisement is displayed, there are no direct user interactions to obtain a quantitative measure of the effectiveness of the advertisement.

SUMMARY

Embodiments of the present invention are directed towards tracking viewer engagement with non-interactive displays. Generally, data is obtained from one or more sensors, such as camera sensors, associated with a non-interactive display, and once a face of a person is detected within the sensor data, a display sequence is initiated. The display sequence includes at least two frames that have at least one feature, such as text location, that is different in the two frames. Using the sensor data, viewer engagement with the display is tracked while the display sequence is presented. Viewer engagement may be tracked using eye movement and/or head movement of the detected person. The detected eye movement and/or head movement is used to determine whether the person was actively engaged with the display sequence. Adjustments to the display sequence may be made based on determinations of viewer engagement over time.

In some embodiments, engagement is determined using a trained neural network. The neural network may be trained using training input images created from a plurality of images to represent a viewer's path of engagement over time during presentation of a display sequence. The training input images may be created from image data capturing a viewer's eye movements and/or head movements during the display sequence. The training input image created for a particular engagement session may be labeled with an engagement level, such as active engagement or non-active engagement. The neural network may be trained based on the training input images and associated labels, and the trained neural network may use newly received sensor data to predict whether a viewer captured within the sensor data was actively engaged with the display sequence.

Further, in some embodiments, display sequence templates may be created and applied to different advertisements or other types of displays. A sequence template has at least two template frames with each frame having at least one different visual feature. An engagement baseline is also generated for that template. The template is applied to content, such as advertising content, to create a first sequence, and the associated engagement baseline is used to evaluate viewer engagement with the first sequence. The template may be similarly applied to other content to create other sequences with the engagement baseline being used to evaluate each one.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 5A-5C depict examples of eye movement tracking during a display sequence, in accordance with embodiments of the present disclosure;

DETAILED DESCRIPTION

Figure 1:
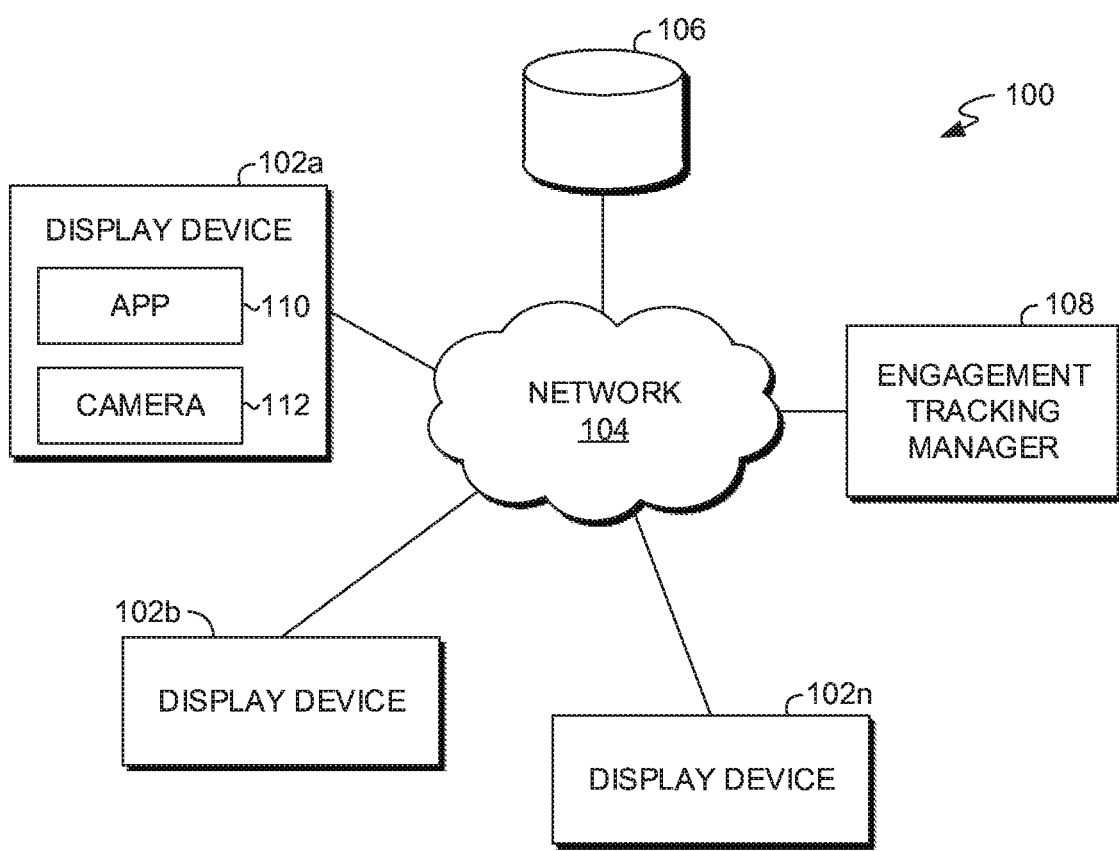
FIG. 1 depicts an example configuration of an environment in which one or more implementations of the present disclosure can be employed, in accordance with various embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed towards tracking viewer engagement with non-interactive displays. With online advertisements or interactive displays, a user's direct interactions, such as ad clicks, may be used to provide a quantifiable measurement of the effectiveness of certain content (e.g., an advertisement) because such interactions show a user is engaged with the content. Determining the effectiveness of content on a non-interactive display, however, is harder to quantify as a user does not "click" or otherwise directly interact with the content. Content on non-interactive displays are traditionally not evaluated for effectiveness in an objective method based on quantifiable measurements.

Accordingly, embodiments of the disclosure are directed to improving prior processes and systems by quantifying a viewer's engagement with content on a non-interactive display by tracking the person's head movements, eye movements, or both head movements and eye movements. In accordance with embodiments of the present invention, sensor data is obtained from at least one sensor associated with a non-interactive display. The camera may be integrated into a non-interactive display device and capture an environment in front of the display such that the sensor data captures information about people who are viewing the display. Once a face of a person is detected within the sensor data, a display sequence is initiated. The display sequence includes a series of frames that have at least one feature, such as text location, that is different between frames. The series of frames may collectively form an advertisement.

As the display sequence is presented on the display, sensors are capturing the person's movements. The resulting data is used to track viewer engagement with the display sequence. Specifically, viewer engagement is tracked by detecting the person's eye movements and/or head movements during the sequence. The tracking data (i.e., the detected eye movement and/or head movement) is used to determine whether the person was actively engaged with the display sequence. Generally, a person who is actively engaged will display movements that correspond to changes within visual features of the frames in the display sequence.

In some embodiments, an engagement level is determined by comparing the tracking data with an engagement baseline that indicates an expected pattern of eye and/or head movements when a person is actively engaged with a particular sequence. The baseline may vary based on the particular sequence. In some aspects, the difference between the current viewer's eye and/or head movements and the baseline is compared to a threshold variance to determine whether the viewer was actively engaged.

In alternative embodiments, a trained neural network is used to determine whether a person was actively engaged with a display sequence based on the head movements and/or eye movements detected in the sensor data. The neural network may be trained using training input images that each represent a viewer's path of engagement over time during a particular presentation of a display sequence. The training input images may be created from sensor data, such as image data, capturing a viewer's eye movements and/or head movements during the display sequence. Each captured image may be associated with a time stamp, and the position of the viewer's eyes and/or head within each captured image may be used to detect an engaged portion of the display, which refers to the portion of the display to which the viewer's attention was directed at a particular time. The captured images from a particular engagement session may be aggregated to create the training input image representing the path of engagement over time. In this way, the training input image may represent an array of time stamps indicating relative times during the display sequence that a viewer was engaged with a particular portion of the display. This unconventional process for creating training input images distills position information, such as head or eye positon, and time information into a single image for training the neural network so that the sensor data captured over time may be more easily used with a neural network to predict viewer engagement.

The training input image created for a particular engagement session may be labeled with an engagement level, such as active engagement or non-active engagement. The neural network may be trained based on the training input images and associated labels, and the trained neural network may use newly received sensor data to predict whether a viewer captured within the image data was actively engaged with the display sequence.

Further, in some embodiments, display sequence templates may be created and applied to different content, such as advertisements, to create different sequences. The template sequence includes at least two template frames with each frame having at least one different visual feature. An engagement baseline is also generated for that template. The template sequence is applied to a set of content, such as advertising content, to create a first sequence, and the associated engagement baseline is used to evaluate viewer engagement with the first sequence. The template may be similarly applied to other content to create other sequences with the engagement baseline being used to evaluate each one.

Advantageously, using eye movement and/or head movement provides a more accurate measure of viewer engagement. As described above, previous methods of determining an effectives of non-interactive content being display did not include an objective measure that could be automatically captured. Utilizing sensor data, such as image data, of viewers of a display and tracking eye and/or head movements allows for an objective determination of whether a user was actively engaged with the content or not. Further, in exemplary aspects, the sensor data is obtained via one or more sensors, such as cameras, and tracking engagement can be performed in real time, providing a more efficient process for tracking engagement and determining an effectiveness of display content. Although there are prior processes for evaluating the effectives of content using objective measurements, such conventional systems are based on measurements from direct user interaction and, therefore, are limited to interactive content on an interactive display. However, embodiments of the disclosure utilize a new technique by tracking eye and/or head movements based on data obtained from sensors, which is a new source of information for evaluating the effectives of content, to improve upon these prior processes such that engagement in non-interactive content may be objectively tracked.

Having briefly described an overview of aspects of the present disclosure, definitions for various terms used throughout this description are provided. Although more details regarding various terms are provided through the description, general descriptions of some terms are included below to provide a clearer understanding of the ideas disclosed herein:

The term "sensor data" is used herein to refer to digital information received from one or more sensors. A sensor may include a camera sensor such that "sensor data" comprises "image data" as defined below. Additionally or alternatively, "sensor data" may comprise information received a depth sensor using infrared depth technology, such as an infrared projector and camera. For instance, the depth sensor may comprise an infrared laser projector with an active pixel sensor, such as a CMOS sensor, to capture 3D video data under any ambient light conditions. In this way, the 3D video data and/or an infrared dot array may comprise the sensor data.

The term "image data" is used herein to refer to digital data that encodes visual information captured by a camera. Image data may comprise video files or one or more photographs, including LDR and HDR image files. Image data may also be used to refer to a frame extracted from a video, including a recorded video or a video feed.

As used herein, the terms "display device" and "display" are used interchangeably to refer to any device, component, or apparatus that is enabled to display image data. A display device may be a display that presents an image by actively generating light corresponding to the image data encoding the displayed image. A display device may include a digital retail display, a computing device, a television, a touch-sensitive screen, or the like, or may include a monitor communicatively coupled to any such devices. A display may include, but is not otherwise limited to, a cathode ray tube (CRT) display, a liquid crystal display (LCD), a light emitting diode (LED) display, an organic LED (OLED) display, a plasma display, or the like. Such active display devices may be included in a computing device, such as but not limited to a mobile device, desktop, or laptop computing device. In other embodiments, a display may include a combination of a projector and surface, such as but not limited to a screen, i.e. a projection system. In such projection embodiments, a projector is employed to project an image onto a screen. In some embodiments, one or more cameras may be embedded in the display device. As used herein, a "non-interactive display" may refer to a display device that is not configured to receive direct input from a user, such as touches or clicks; however, it is also contemplated that "non-interactive display" may refer to a device that is configured to receive such input and/or display interactive content but that is being used to displaying at least some content that is not intended for direct user interaction.

As used herein, the term "display sequence" (which may also be referred to as "sequence") refers to a series of frames that, when presented, are displayed as a sequence. The sequence may comprise a video file or slide show of a plurality of images.

As used herein, the term "frame" refers to an single image, a frame of a video file, a slide within a slide show, or other forms of multimedia configured with digital content.

As used herein, the term "visual feature" refers to a feature that forms part of the visual aspect of content. The visual feature may include the position, orientation, color, lighting, transparency, size, font type, font style, and the like. The visual feature may relate to textual objects, images, icons, or videos.

As used herein, the term "content" refers digital data that includes at least one of image data or textual data. In various embodiments, content may include audio data, video data, and the like. The image data included in content may be at least two-dimensional (2D) image data. Content may include, but is not otherwise limited to digital visual advertisements, promotions, offerings, suggestions, or any other visual content.

Example Computing Environment

FIG. 1 depicts an example configuration of an environment in which some implementations of the present disclosure can be employed to track viewer engagement with a non-interactive display. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 13.

It should be understood that environment 100 shown in FIG. 1 is an example of one suitable operating environment. Among other components not shown, environment 100 includes a number of display devices, such as display devices 102*a* and 102*b* through 102*n*, network 104, engagement tracking manager(s) 108, and one or more databases 106. Each of the components shown in FIG. 1 may be implemented via any type of computing device, such as one or more of computing device 1300 described in connection to FIG. 13, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

Display devices 102*a* through 102*n* may be any type of device capable of displaying an image corresponding to image data. For example, in some implementations, display devices 102*a* through 102*n* are digital retail display signs. Further, display devices 102*a* through 102*n* may be the type of computing device described in relation to FIG. 13. By way of example and not limitation, a display device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device with a built-in display screen or communicatively coupled to a display screen.

Display devices 102a through 102n may include one or more processors and one or more computer-storage media. The computer-storage media may include computer-readable instructions executable by the one or more processors. The instructions may be embodied by one or more applications, such as application 110, capable of facilitating tracking of viewer engagement and/or the exchange of information between display devices 102a through 102n and a viewer engagement tracking manager, such as engagement tracking manager 108. In one example, the display devices 102a through 102n may include or utilize, through network 104, an application for delivering custom content, such as the Adobe® Experience Manager application. In some cases, application 110 is integrated into the operating system (e.g., as a service). It is, therefore, contemplated herein that "application" be interpreted broadly.

As described herein, engagement tracking manager 108 is generally configured to represent functionality to implement tracking a viewer's engagement with a display sequence on a display device, such as devices 102a-102n. Engagement tracking manager 108, or aspects or components associated therewith, may be implemented as software modules, hardware devices, or using a combination of software, hardware, firmware, fixed logic circuitry, etc. Further, engagement tracking manager 108, or components thereof, may be implemented on a server remote from the display devices 102a-102n, as illustrated, or may be implemented locally on a display device, such as through application 110 of display device 102a.

In accordance with embodiments herein, engagement tracking manager 108 tracks a viewer's engagement with a display on the display devices 102. Viewer engagement is tracked using sensor data capturing two-dimensional or three-dimensional information about one or more people viewing or otherwise directing their attention to display device 102a. The sensor data, such as images or video of a person's face watching a display sequence on display device 102a, is received by the engagement tracking manager 108. The sensor data may be captured by and received directly from a sensor, such as camera 112, integrated into or connected to display device 102a. In embodiments in which engagement tracking manager 108 resides on a remote server, sensor data may be received by an application 110 facilitating communication between display device 102a and engagement tracking manager 108. The sensor data may be received in real time such that engagement can be tracked in real time or may be periodically received. In some embodiments, display device 102a includes or is connected to multiple sensors, such as cameras, that each provide sensor data.

At a high level, engagement tracking manager 108 initiates a display sequence to be displayed on a device, such as display device 102a, when a face of a person is detected in sensor received by engagement tracking manager 108. During the display sequence, sensor data is captured of the person's face to determine whether the person has remained engaged with the display sequence. Engagement may be determined by tracking eye movement, head movement, or both eye movement and head movement. The tracking data is used to classify the person's movements as a level of engagement, such as actively engaged or not actively engaged. As described in greater detail below, classifying the level of engagement may include generating a representation of eye position and/or head position of the person over the course of a display sequence, such as a heat map. The generated representation be compared to an engagement baseline indicating expected movement for a particular level of engagement or may be input into a neural network trained to predict viewer engagement. An example embodiment utilizing a neural network is discussed further with respect to FIG. 7.

Continuing with FIG. 1, database 106 may store computer instructions (e.g., software program instructions, routines, or services), data, and/or models used in embodiments described herein. In some implementations, database 106 stores information or data received via the various components of engagement tracking manager 200 and provides the various components with access to that information or data as needed. Although depicted as a single component, database 106 may be embodied as one or more data stores. Further, the information in database 106 may be distributed in any suitable manner across one or more data stores for storage (which may be hosted externally or internally). In some embodiments, database stores captured sensor data (such as image data), display sequences to be displayed on a display devices, template sequences, engagement baselines, representation of eye and/or head positon over time generated based on captured sensor data (e.g., heat maps, grayscale images representing paths over time), logs of complete or incomplete tracking sessions, and logs indicating levels of engagement determined for each tracking session.

Figure 2:
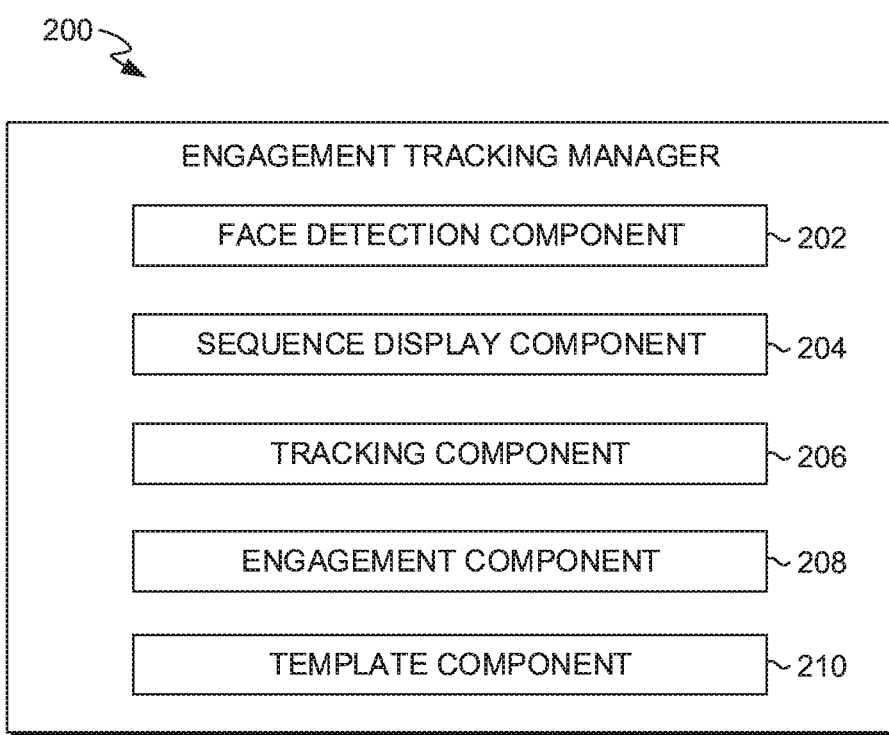
FIG. 2 depicts aspects of an illustrative engagement tracking manager, in accordance with various embodiments of the present disclosure.

Referring now to FIG. 2, aspects of an engagement tracking manager 200 are shown, in accordance with various embodiments of the present disclosure. Engagement tracking manager 200 may be the same engagement tracking manager 108 depicted in FIG. 1. Engagement tracking manager 200 may include face detection component 202, sequence display component 204, tracking component 206, and engagement component 208. In some embodiments, engagement tracking manager 200 further includes template component 210. The foregoing components of engagement tracking manager 200 may be implemented, for example, in operating environment 100 of FIG. 1. In particular, those components may be integrated into any suitable combination of display devices 102a and 102b through 102n, or distributed to multiple devices using a cloud-based implementation. Although these components are illustrated separately, it can be appreciated that the functionality described in association therewith can be performed by any number of components.

Face detection component 202 detects when sensor data received from a sensor integrated into or otherwise associated with a display device depicts a person's face. For instance, in FIG. 3, a display device 300 is depicted with a display screen 302 and cameras 304a, 304b, 304c. The cameras 304a-304c may be integrated into the display device 300 on the same side as the display screen 302 such that cameras 304a-304c provide a field of view in front of the display screen 302. In this way, cameras 304a-304c show people situated in front of the display device 300, such as a person 306 standing in front of the display screen 302, as illustrated in FIG. 3, or people passing by the display screen 302.

Figure 3:
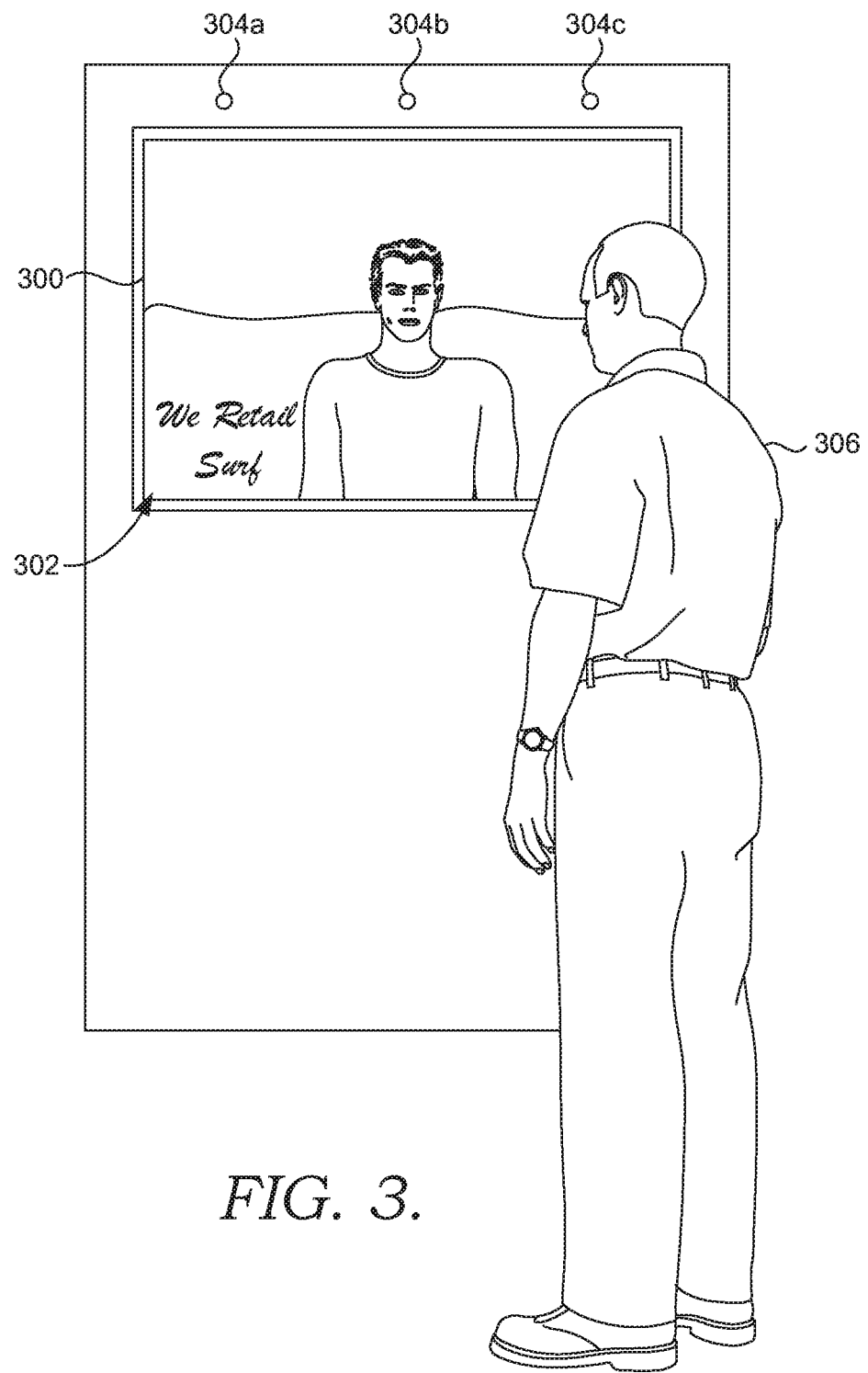
FIG. 3 depicts an example non-interactive display device, in accordance with embodiments of the present disclosure.

Returning to FIG. 2, face detection component 202 detects a face of a person, such as person 306 in FIG. 3, that is visible from data captured by at least one sensor, such as a camera. In this way, face detection component 202 determines when an individual is at least partially facing the display, such as display screen 302. Face detection component 202 may use various technologies, including machine learning technologies, to detect a face. For instance, face detection component 202 may use a harr cascade classifier, a local binary pattern classifier, a neural network, and the like to detect a face. In some embodiments, faces of multiple people may be detected at once. Face detection component 202 may scan for faces within sensor data continuously or periodically.

Sensor data may be received by one or more sensors associated with a single display screen. In exemplary aspects, where eye movement is tracked, there are at least two sensors, such as two cameras, providing data to be used for tracking eye movement, with each sensor capturing a different field of view to provide increased accuracy for tracking engagement. In some aspects, the same one or more sensors may be used to provide data for detecting faces, tracking eye movement, and/or tracking head movement. In alternative aspects, sensor data from a different set of sensors is used for different aspects of tracking engagement. For example, face detection component 202 may use image data from a single camera to detect a face in front of a display screen. Once a face is detected, image data from multiple cameras may be utilized to track movement, such as eye movement and/or head movement. Further, in some embodiments, more sensors may be provide image data for tracking eye movement than for tracking head movements.

Once a face is detected, the sequence display component 204 initiates a display sequence on the display device. The display sequence will be used to test the person's engagement. Accordingly, by initiating the display sequence after detecting a face, there is a greater likelihood that someone is already directing his or her attention to the display device and will see the display sequence. In some embodiments, the display device, such as device 300, continuously displays an individual frame of the display sequence until a face is detected, and then the entire display sequence is presented over a duration of time. Alternatively, a screen of a display device may appear blank or continuously display content that is not part of the display sequence until a face is detected and the sequence is initiated.

The display sequence initiated by sequence display component 204 comprises a sequence of visual content, such as images or a video. The visual content will be presented over a period of time, and the at least one visual feature within the display sequence will change during the period of time. Specifically, the display sequence comprises frames that have at least one visual feature different from other frames. As used herein, a "frame" refers to an image file, a frame of a video file, a slide within a slide show, or other forms of multimedia configured to be presented through a display. In exemplary aspects, the display sequence includes between two and five frames. Each frame may be presented for a portion of the duration of the display sequence. For example, each frame may be presented for a duration between one and five seconds. In some aspects, each frame is displayed for an equal amount of time, while in alternative aspects, the amount of time for which each frame is displayed varies.

The visual feature that differs between frames within the display sequence may comprise the content, location, orientation, color, lighting, transparency, or other feature that contributes to the visual effect of a particular aspect within the frame. For instance, a text may appear in different locations in different frames such that, when the display sequence is presented, text appears to move around the display. In other examples, the color of an icon or the content of a background photograph may be different between different frames of the sequence.

In exemplary aspects, each particular frame has only one or two visual features that differ from the frame that is presented immediately before and the frame that is presented immediately after the particular frame. Other visual features may remain constant between successive frames or throughout the entire display sequence. In this way, the visual changes occurring during the display sequence may be subtle. By limiting the degree of change between frames, the fact that a person continues to look at the display screen can more likely be attributed to actual engagement in the content of the display sequence rather than a general interest in a jarring or shocking visual effect that catches the eye.

In some aspects, a subset of frames may share a visual feature that is different from frames in other subsets. For instance, if content being displayed is in a video file format, there may be a first subset of sequential video frames that each have a first visual feature and a second subset of sequential frames that each have a second visual feature. When the video is presented, the frames in each subset may collectively be displayed for a threshold duration, such as one to two seconds. In this way, the visual features that change within frames of a video file may be presented long enough for a viewer to notice the features.

Figure 4:
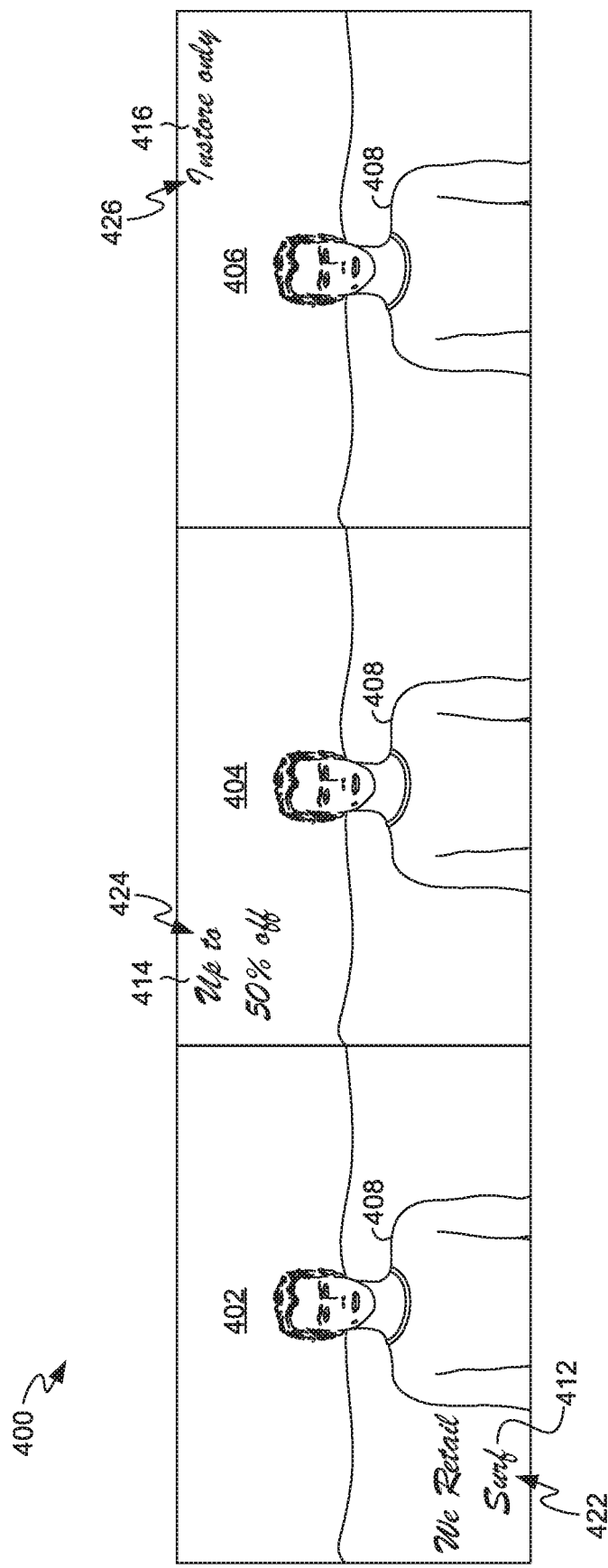
FIG. 4 depicts an example display sequence to be initiated during engagement tracking, in accordance with embodiments of the present disclosure.

FIG. 4 illustrates an example display sequence 400 in accordance with embodiments described herein. The display sequence 400 includes a first frame 402, a second frame 404, and a third frame 406. The first frame 402 includes a text item with a first text content 412 ("We Retail Surf") in a first position 422 in the lower-left corner of the first frame 402. The second frame 404 also includes a text item, but this text item has a second text content 414 ("Up to 50% off") in a second position 424 in the upper-left corner of the frame. The third frame 406 includes a text item with a third text content 416 ("instore only") in a third position 426 in the upper-right corner. As such, as display sequence 400 is presented, the content and location of a text item is changed. At least one element, such as the background image or graphic 408, remains constant throughout the frames.

As illustrated in FIG. 4, the one or more visual features that changes between frames may be consistent throughout the sequence. For instance, in FIG. 4, both text content and text location changes between each frame of the display sequence 400. It is contemplated, however, that the visual features that change may differ throughout the sequence. For instance, between a first frame and second frame, a text content and text location may both change, and between the second frame and the third frame, a text content and text color may change while the location remains the same.

Returning to FIG. 2, as a display sequence is being presented, tracking component 206 tracks the viewer's engagement with the display. Like face detection component 202, tracking component 206 utilizes sensor data, such as image data or 3D depth data, from one or more sensors associated with the display device, but the sensor data used by tracking component 206 may be limited to data that is captured during the display sequence. Tracking component 206 uses the sensor data to track or monitor movements of the viewer, such as eye movements and head movements. For instance, tracking component 206 may detect the position of a viewer's pupil and track the change in pupil position over the duration of the display sequence. In addition to or alternatively, tracking component 206 may detect a viewer's head position and track the change in the head position over the duration of the display sequence. In exemplary embodiments, head movements are tracked using movements along the x-axis (pitch), y-axis (yaw), and z-axis (roll). In some embodiments, both eye movement and head movement are tracked by tracking component 206. In alternative embodiments, either eye movement or head movement is tracked.

In exemplary embodiments, engagement tracking manager 200 can determine when the viewer's face is no longer detected. This function may be performed by face detection component 202 or tracking component 206. If a viewer's face is no longer detected during the display sequence, it is determined that the viewer lost engagement, such as when a viewer turns or walks away from the display. In some embodiments, tracking is stopped once it is determined that a viewer lost engagement, and the tracking session may be considered incomplete. When a tracking session is incomplete and tracking is stopped, the display sequence may continue until it is finished. Alternatively, the display sequence may also be stopped.

When a tracking sequence is complete, engagement component 208 uses the tracking information to determine whether the viewer was actively engaged in the display sequence. Generally, when a viewer is actively engaged in a display sequence, movements of the viewer will reflect the changes of the visual features within the display sequence. FIGS. 5A-C, for instance, depict a viewer 500 who is actively engaged with a display sequence, as shown by the viewer's eye movements. The display sequence includes a first frame 502, a second frame 504, and a third frame 506 illustrated in FIGS. 5A, 5B, and 5C, respectively. The frames 502, 504, and 506 are illustrated as facing viewer 500 such that content on the front of the frames is visible to viewer 500; however, dashed lines indicating a location of at least one object, such as text, an icon, or a picture, within the frames are provided to illustrate how a viewer's eye movements track the object when the viewer is actively engaged.

First frame 502 includes a first object 512 in a first position 522; second frame 504 includes a second object 514 in a second position 524; and third frame 506 includes a third object 516 in a third position 526. First position 522 is in the lower-right corner of first frame 502; second position 524 is in the upper-right corner of second frame 504; and third position 526 is in the lower-left corner of third frame 506. When viewer 500 is actively engaged in the display sequence as illustrated in FIGS. 5A-C, viewer 500's eye movements, which may be determined by pupil positions, correspond to changes within positions of the objects. As such, viewer 500's eyes are looking down and to the right in FIG. 5A, up and to the right in FIG. 5B, and down and to the left in FIG. 5C. These relative directional terms are used as illustrated in FIGS. 5A-C, but it will be appreciated that directional terms may be different from the perspective of viewer 500.

Figure 6A:
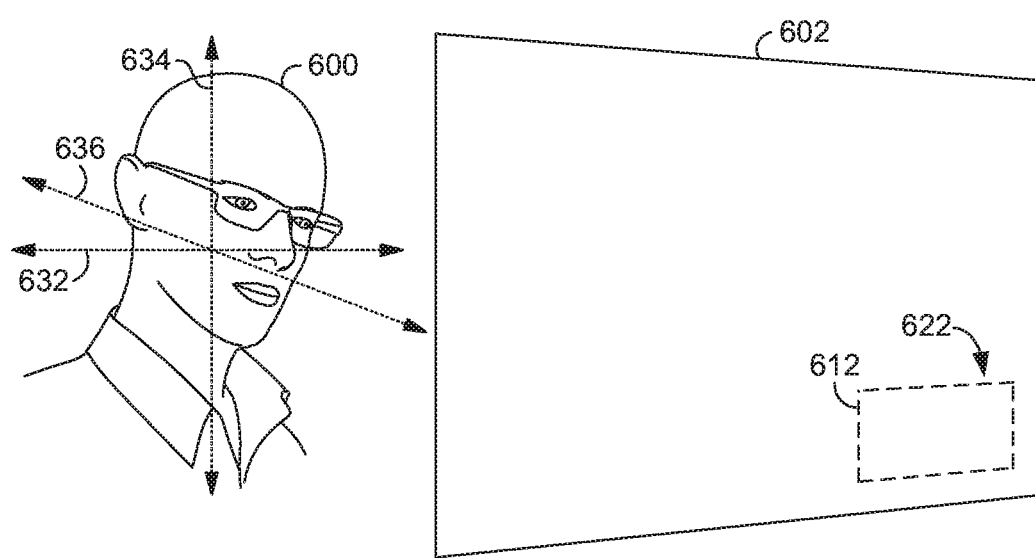
FIGS. 6A-6C depict examples of head movement tracking during a display sequence, in accordance with embodiments of the present disclosure.
Figure 6B:
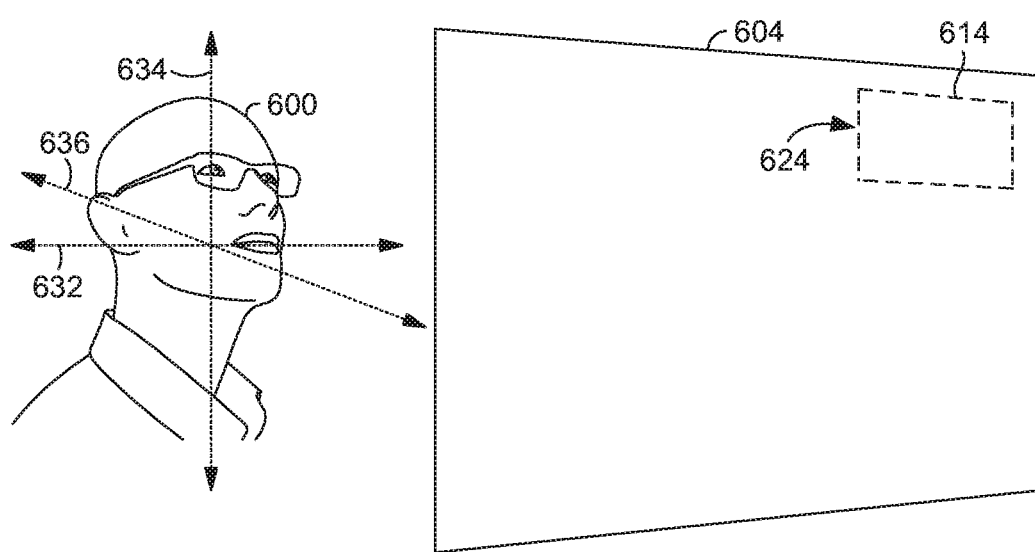
Figure 6C:
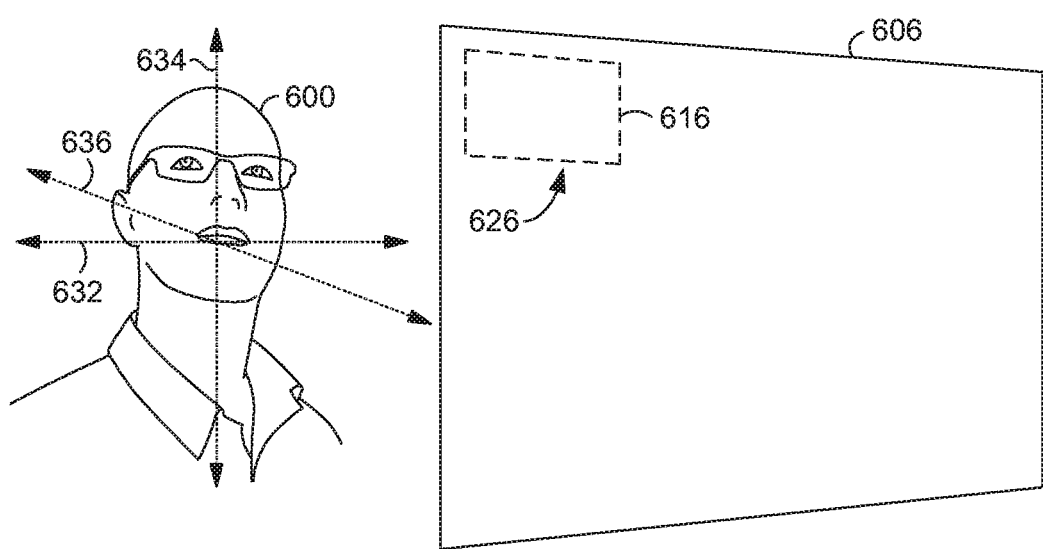

Similarly, FIGS. 6A-C illustrate a viewer 600 who is actively engaged with a display sequence, as shown by the viewer's head movements. The display sequence includes a first frame 602, a second frame 604, and a third frame 606 illustrated in FIGS. 6A, 6B, and 6C, respectively. The frames 602, 604, and 606 are illustrated as facing viewer 600 such that content on the front of the frames is visible to viewer 600; however, dashed lines indicating a location of at least one object, such as text, an icon, or a picture, within the frames are provided to illustrate how viewer 600's head movements track changes of visual features within the sequence.

First frame 602 includes a first object 612 in a first position 622; second frame 604 includes a second object 614 in a second position 624; and third frame 606 includes a third object 616 in a third position 626. First position 622 is in the lower-right corner of first frame 602; second position 624 is in the upper-right corner of second frame 604; and third position 626 is in the upper-left corner of third frame 606. When viewer 600 is actively engaged in the display sequence as illustrated in FIGS. 6A-C, viewer 600's head movements, which may also be referred to as head gait, correspond to changes of the positions of the objects.

In exemplary aspects, head movements are determined by pitch, yaw, and roll. As used herein, pitch refers to a rotation around a transverse axis (the x-axis 632); yaw refers to a rotation along a vertical axis (the y-axis 634); and roll refers to rotation around a longitudinal axis (z-axis 636). In FIG. 6A, viewer 600 has rotated his head from a neutral position around at least the x-axis 632 and the y-axis 634 to direct his head towards a lower-right corner of frame 602. In FIG. 6B, viewer 600 has rotated his head at least around the x-axis 632 to look up towards the upper-right corner of frame 604, and in FIG. 6C, viewer 600 has rotated his head at least around the y-axis 634 to look over to the upper-left corner of frame 606. Similar to FIGS. 5A-C, these relative directional terms are used as shown in FIGS. 6A-C, but it will be appreciated that directional terms may be different from the perspective of viewer 600. In some embodiments, these head movements are calculated as degrees of rotation along each axis. Alternatively or in addition to degrees of rotation, head movements may be classified as a direction, such as "straight forward," "upper-right corner," "upper-left corner," and the like.

Although viewer 500 in FIGS. 5A-C is depicted as viewing a different display sequence as viewer 600 in FIGS. 6A-C, it is contemplated that both eye movement and head movement may be tracked for the same display sequence for a single viewer. Additionally, although only the positions of objects were illustrated as changing in FIGS. 5A-C and FIGS. 6A-C, it will be appreciated that content, size, and/or color of the objects may also be changing within each of the illustrated sequences.

Returning to FIG. 2, engagement component 208 of engagement tracking manager 200 uses the tracking data, such as head positions and or eye positions over a duration of time, to determine whether the viewer was actively engaged. In some embodiments, engagement of the viewer is classified using a baseline, such as a positive baseline and/or a negative baseline. As used herein, a positive baseline refers to a known pattern of movement a viewer who is actively engaged with the particular display sequence, and a negative baseline refers to a known pattern of movement of viewer who is not actively engaged with the display sequence. A baseline may reflect eye movements, head movements, or both eye and head movements. Each baseline may be generated by averaging a plurality of known patterns.

In exemplary embodiments, the baseline comprises a representation of eye position and/or head position over time. For instance, the baseline may comprise a heat map, which is a graphical representation of data with data values provided within a matrix. The matrix may comprise a matrix of probabilities that a viewer's gaze or head position was over a pixel of a frame. Accordingly, a positive baseline heat map indicates where, within a frame of the image data, a viewer's eyes and/or head are positioned when a viewer is known to be actively engaged in a display sequence. Generally, the eye and head movements will correspond with changes in the visual features within the display sequence. Using display sequence 400 as an example, a positive baseline heat map may show a viewer's eyes directed to the lower-left corner and/or the viewer's head titled downward and to the left for the first frame 402; a viewer's eyes directed to the upper-left corner and/or the viewer's head titled upward and to the left for the second frame 404; and a viewer's eyes directed to the upper-right corner and/or the viewer's head titled upward and to the right for the third frame 406. A negative baseline heat map may indicate where a viewer's eyes and/or head are positioned when the viewer is known to not be actively engaged with the display sequence.

In some embodiments, a heat map may be used to generate a grayscale image baseline in which the highest probability within the matrix of the heat map is used to indicate a path of viewer engagement within a grayscale image. The path within the grayscale image may comprise a gradient line with the intensity value of the pixels corresponding to a time stamp. It is further contemplated that the baseline may comprise a grayscale image without first generating a heat map. Embodiments of this type of baseline are descried in greater detail with respect to FIGS. 7 and 8A-B.

To determine viewer engagement based on newly received tracking data, a representation of position over time, such as a heat map, may be generated by engagement component 208 using the tracking data. Once the heat map, for example, for a particular tracking session is created, it is compared to a baseline, such as a positive baseline heat map. In exemplary aspects, the heat map for the current tracking session and the baseline are compared to determine the difference in eye or head locations within a sensor's field of view at different points in time. For instance, the heat map may provide a plurality of (x,y) mappings at different points in time. If, based on the mappings, at t=1, a viewer's eyes are at position (2,2), and the positive baseline at t=1 is a position of (1,1), the distance between these positions would be equal to $\sqrt{(2-1)^2+(2-1)^2}$. This distance may be computed for multiple time stamps, and the differences may be averaged together. It is contemplated that the differences of the locations over time may be computed using other methods or formats, such as using time dimension matrices. Further, it is also contemplated the computed differences may be a difference in time for each positon or group of positions. For instance, if the baseline is a position of (1,1) at t=1 (such as 1 second), and the viewer's eyes are in position (1,1) at t=0.5, the difference may be a difference of 0.5 seconds. Differences for a plurality of positions may be computed and averaged together.

In exemplary embodiments, after the difference between the newly created representation, such as a heat map, and a baseline is determined, engagement component 208 determines whether the newly created representation is sufficiently similar to a positive baseline by comparing the differences to a pre-determined threshold variance. The threshold variance may be a distance between positions and/or a time duration. For instance, using the above example, the distances computed at each time stamp are averaged together, and the average difference is compared to a threshold distance. Additionally, differences in time stamps for different positions may be compared to a threshold duration of time. In some embodiments, the threshold variance comprises a range such that the recently obtained tracking data may be within a certain distance from a baseline in either direction. When the difference between the baseline and the heat map for the current tracking session is within the threshold variance, the tracking session may be classified as active, and when the difference is outside the threshold variance, the session is classified as not active.

Figure 7:
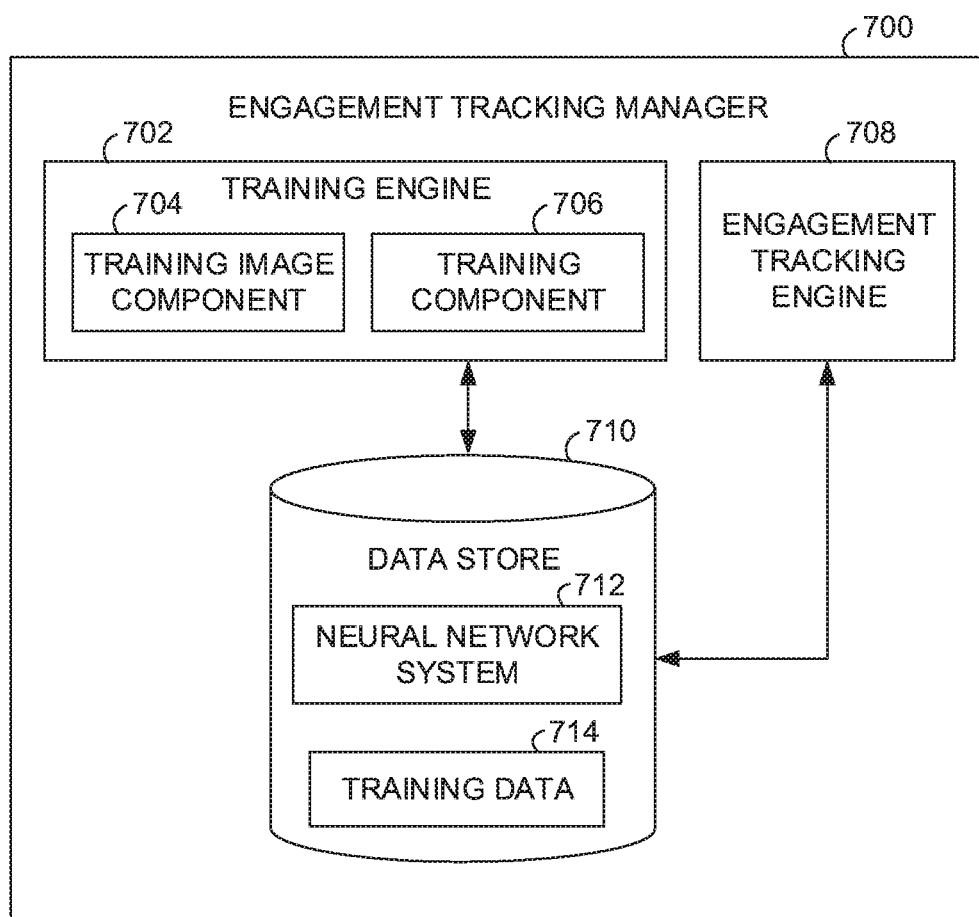
FIG. 7 depicts an example engagement tracking manager, in accordance with embodiments of the present disclosure.

In alternative embodiments, rather than comparing the tracked movements to a baseline, engagement component 208 utilizes one or more trained neural networks to classify input data as an active engagement session or a non-active engagement session. FIG. 7 illustrates an example engagement tracking manager 700 that may be provided in embodiments utilizing a neural network. Engagement tracking manager 700 may include training engine 702, engagement tracking engine 708, and data store 710. The foregoing components of engagement tracking manager 700 may be implemented, for example, in operating environment 100 of FIG. 1 and as part of the engagement tracking manager 200 of FIG. 2.

Data store 710 may represent all or part of database 106 in FIG. 1 or may be in addition to database 106. Accordingly, data store 710 may store any of the information disclosed with respect to database 106. In embodiments, data stored in data store 218 includes training data 714. Training data generally refers to data used to train a neural network, or portion thereof. As such, training data 714 can include training input images, labels associated with training input images, captured sensor data used to create the input images, any transformed form of training input images created in training the neural network (such as gray scale versions of training images), and output engagement labels. In some cases, engagement tracking manager 700 receives data directly from display devices (e.g., an input image received by display device 102a or another device associated with a camera, via, for example, application 110). In other cases, data is received from one or more data stores in the cloud. Data store 718 may also be used to store neural network system 712 comprising one or more neural networks.

Training engine 702 may be used to train neural network system 712 to predict viewer engagement with a display sequence. As depicted in FIG. 7, training engine 702 includes a training image component 704 and a training component 706. Although these components are illustrated separately, it can be appreciated that the functionality described in association therewith can be performed by any number of components.

Training image component 704 may provide training images to be used by training component 706 to train neural network system 712. The training data may comprise image data showing at least one viewer's face as a particular display sequence is played, and the image data may be labeled to indicate whether the viewer was actively engaged or not. The training data may comprise other types of sensor data, such as an infrared dot array, for example. In some embodiments, the training data comprises training input images representing an array of time stamps of eye movements and/or head movements. For eye movement, the time stamps indicate when a pupil moves over a particular location within a field of view of the sensor. For head movement, the time stamps indicate when a particular head position is detected within the field of view of the sensor.

In exemplary aspects, training image component 704 generates the training input images that are to be fed into the neural network system 712 for training purposes. In exemplary aspects, the training input images indicate a path of each viewer's engagement with a display sequence over time within a single image. In some instances, training image comprises an image file, such as a JPEG or PNG file and comprises a line of engagement showing the path of the viewer's engagement over the image. As such, the dimensions of the training input image may correspond to the relative dimensions of the display presenting the display sequence. It is further contemplated that the training input image comprises an array of time stamps representing the viewer's path of engagement over time rather than an image file.

Each training input image represents a single engagement session that takes place over a duration of a display sequence. Accordingly, a plurality of images depicting a viewer during a single engagement session may be received and utilized to create a particular training input image. The images may be captured during the presentation of the display sequence and may each be associated with a time stamp. Each captured image may be received in a size corresponding to a display presenting the display sequence or may be re-sized after being received. For each captured image, an engaged portion of the display is identified. The engaged portion of the captured image comprises one or more pixels that correspond to a region on the display to which the viewer's eyes or head is directed. As such, the engaged portion indicates where a viewer's attention was directed during the display sequence as determined from eye or head movements described above with respect to FIGS. 5A-6C.

Each captured image for an engagement session is associated a different time stamp during an engagement session. As such, the detected engaged portions in at least some of the captured images may be aggregated to identify the path of the viewer's engagement over time. For example, a first pixel or group of pixels may form the engaged portion at a first time and a second pixel or group of pixels may form the engaged portion at a second time. Each engaged portion (pixel or group of pixels) within the aggregated engaged portions may be assigned a value to represent a time at which the viewer was engaged with the particular portion. The time is determined from the time stamp associated with a particular captured image.

In exemplary aspects, the value assigned to each engaged portion is an intensity value. The intensity value may represent an amount of light visible at each pixel. As such, the training input image comprises a grayscale image with the engaged portions ranging along a grayscale gradient from white to black depending on the intensity value assigned to the pixels based on corresponding time stamps. In other words, the training input image may comprise a grayscale gradient line showing the aggregated engaged portions where the shade of the grayscale gradient indicates the relative time at which the viewer directed his or her attention to that particular portion during presentation of a display sequence.

In some aspects, the intensity values range from 0 to 255 such that there may be 256 different intensity values. It will be appreciated that the value may be selected from alternative ranges. Because the intensity values represent time stamps, the range of the intensity values may include a wide range of time stamps. In exemplary aspects, time stamps are provided in millisecond values, and during the display of even a short display sequence, the range in milliseconds of the time stamps can be a large range. When the range of values assigned to pixels in the training images is too large, as may be the case when the pixel values are determined directly from time stamp values in milliseconds, training the neural network may be more difficult or time consuming. Therefore, initial values of the time stamps, such as milliseconds, may be converted to fall within a narrower range of values, such as from 0 to 255, such that the training image data is more manageable.

Each training input image may be associated with a label (also referred to herein as a reference label). The label indicates whether the viewer was actively engaged with a particular display sequence or was not actively engaged. As described further below, these labels will be used with the training input images to train the neural network system.

Figure 8A:
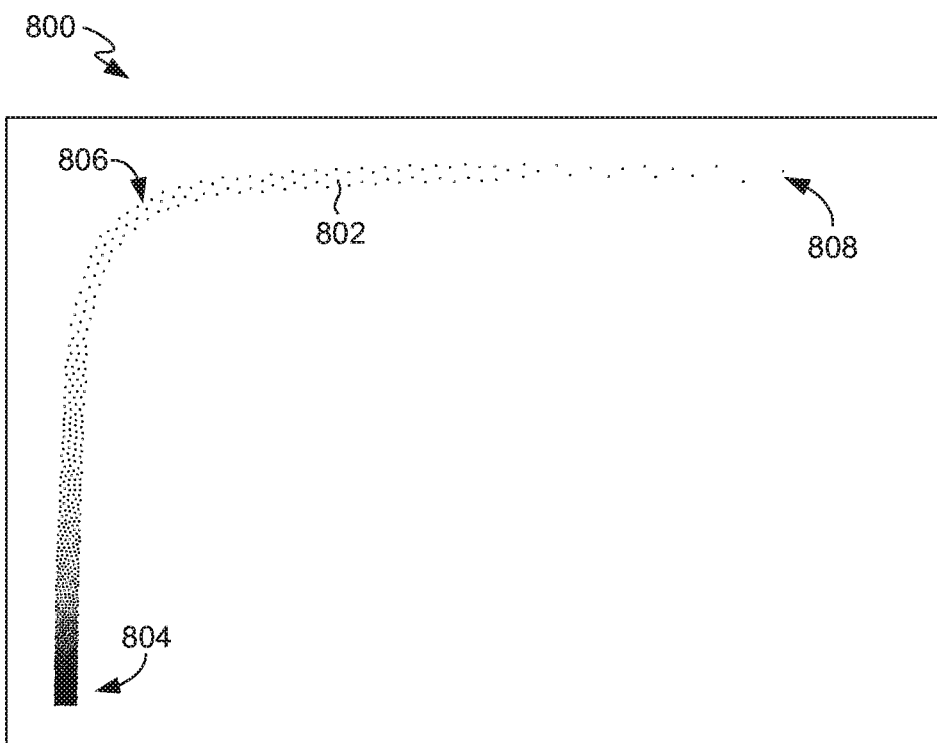
FIGS. 8A and 8B depict example training input images created in accordance with embodiments of the present disclosure.
Figure 8B:
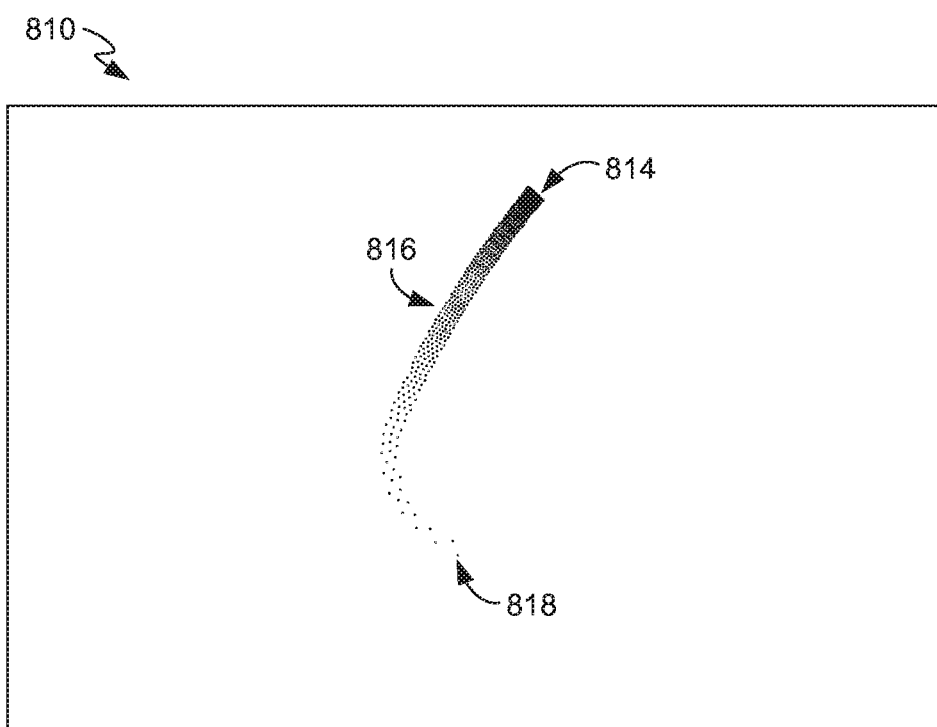

FIGS. 8A and 8B depict example training input images 800 and 810, respectively. Training input images 800 and 810 may represent separate engagement sessions for a particular display sequence, such as display sequence 400 of FIG. 4. In other words, each of training input images 800 and 810 may be created using images captured of a viewer during the presentation of display sequence 400. Training input image 800 includes line of engagement 802. Line of engagement 802 represents the portions of a display presenting the display sequence with which the viewer was determined to be engaged based on one or more of the viewer's eye position and head position. Line of engagement 802 comprises a gradient line created from intensity values being assigned to pixels within each of the engaged portions. The intensity values correspond to a relative time associated with the captured image from which the engaged portion was identified. In this example, the darker portions of the line of engagement 802 represent an earlier time, such as the start of a display sequence, while the lighter portions represent later times. However, it is contemplated that, in alternative embodiments, lighter portions can represent earlier times while darker portions can represent later times depending on how time stamps are converted to intensity values.

Line of engagement 802 moves from a lower-left region to an upper-left region and then moves to an upper-right region within training input image 800. The darkest portion 804 of line of engagement 802 is in the lower-left region, a middle-intensity portion 806 is in the upper-left region, and the lightest portion 808 is in the upper-left region. As such, it can be determined that, during the display of sequence 400, a viewer's eyes and/or head were first directed in the lower-left region of a display, moved to the upper-left region during the middle of the sequence, and then moved to the upper-left region at the end of the sequence. This path of engagement depicted by line of engagement 802 follows the changes to the text in frames 402, 404, and 406 of display sequence 400. As such, training input image 800 represents an active engagement session and, therefore, may be associated with an active engagement label.

In contrast, training input image 810 shown in FIG. 8B is from a non-active engagement session. The line of engagement 812 in training input image 810 extends from an upper middle region of the image towards a lower-middle region. Specifically, the darkest portion 814 of the line of engagement 812 is in the upper-middle region, a middle-intensity portion 816 in the central region, and the lightest portion 818 in a lower-middle region. As such, it can be determined that, during the display of sequence 400, a viewer's eyes and/or head were first directed towards the upper-middle region of the display while frame 402 was presented, moved to the central region while frame 404 was presented, and moved down to the lower-middle region of the display while frame 406 was presented. This path of engagement depicted by line of engagement 812 does not match the changes occurring during display sequence 400 and, therefore, training input image 810 would be associated with an non-active engagement label.

The training data is input into a neural network system to generate a probability of a particular viewer being actively engaged in a display sequence. During training, the label associated with each training input image is compared to the output from the neural network to determine any errors, which are used to adjust the neural network system. This process is repeated for other iterations with adjustments being made until the neural network achieves a minimum accuracy level.

Once trained, the neural network may be used to classify engagement of a viewer when engagement is not already known. Accordingly, engagement component 208 may input, into the neural network, a training input image indicating eye movement and/or head movement of a viewer during the presentation of the display sequence. In other embodiments, where the neural network is trained using sensor data (such as image data or infrared depth data), rather than a heat map over a matrix of time stamps, such sensor data is directly input into the trained neural network. Based on the input, the trained neural network determines a probability that the viewer was actively engaged with the display sequence. In exemplary aspects, the output probability is compared to a threshold level, and the input data is classified as either an active engagement session or an non-active engagement session based on whether probability satisfied the threshold.

In exemplary aspects, the neural network system 712 may comprise one or more neural networks configured to classify image data. For instance, the system 712 may comprise a convolutional neural network comprising multiple max pooling layers with activation functions and a fully-connected layer.

Once an engagement classification for a particular engagement session is determined either by comparing the tracking data to a baseline or using a trained neural network, a record of the determination may be stored in a log associated with the display sequence. Determinations for multiple sessions may be stored in the log with each record indicating at least whether a captured viewer was actively engaged or not actively engaged with the display sequence. The log may be stored in a database on a display device or may be stored remotely. When stored remotely, the log may comprise records from multiple devices that track engagement for a particular display sequence. Additionally, logs associated with other display sequences and indicating engagement determinations for those sequences may be similarly created and stored. In addition to being stored in a database, such as database 106, the determination of engagement for a particular session may be communicated to one or more user devices or displayed for presentation on the display device.

This process may be repeated for multiple viewers, and in some embodiments, may be performed in multiple locations for a particular display sequence. The collective determinations of engagement may be sent to a remote server and used to determine the effectiveness of a particular display sequence. In some embodiments, an effectiveness score for a particular display sequence is computed. The effective scores indicates how well a sequence keeps a viewer engaged and may comprise the percentage of viewers who were actively engaged out of all the viewers who viewed the display sequence. The effectiveness score may be stored in a database or communicated to and presented on a user device.

Effectiveness scores may be computed in similar manners for different display sequences. Scores for similar sequences, such as different sequences in an advertisement campaign, may be compared to determine how to tailor sequences to increase effectiveness of an overall campaign. For instance, if a display sequence within an advertisement campaign is more effective that other sequences, it may be determined to increase the budget for that particular sequence such that the sequence is displayed more often. Additionally, in some embodiments, determining how to tailor sequences may also include adjusting the visual feature changes in display sequences to reflect the changes within display sequences that have higher effectives scores. For instance, if a display sequence that generally changes the location of the content from a left-to-right direction has a higher effectives scores, a left-to-right direction for visual feature changes may be applied to other sequences.

Returning to FIG. 2, in some embodiments, engagement tracking manager 200 may also include a template component 210 to create, store, and/or apply templates to different content, such as different advertisements. In embodiments in which engagement tracking manager 200 represents functionality performed locally on a display device, templates may be created and stored remotely, and a local template component 210 may retrieve the template and apply it to track engagement for different display sequences.

Figure 9A:
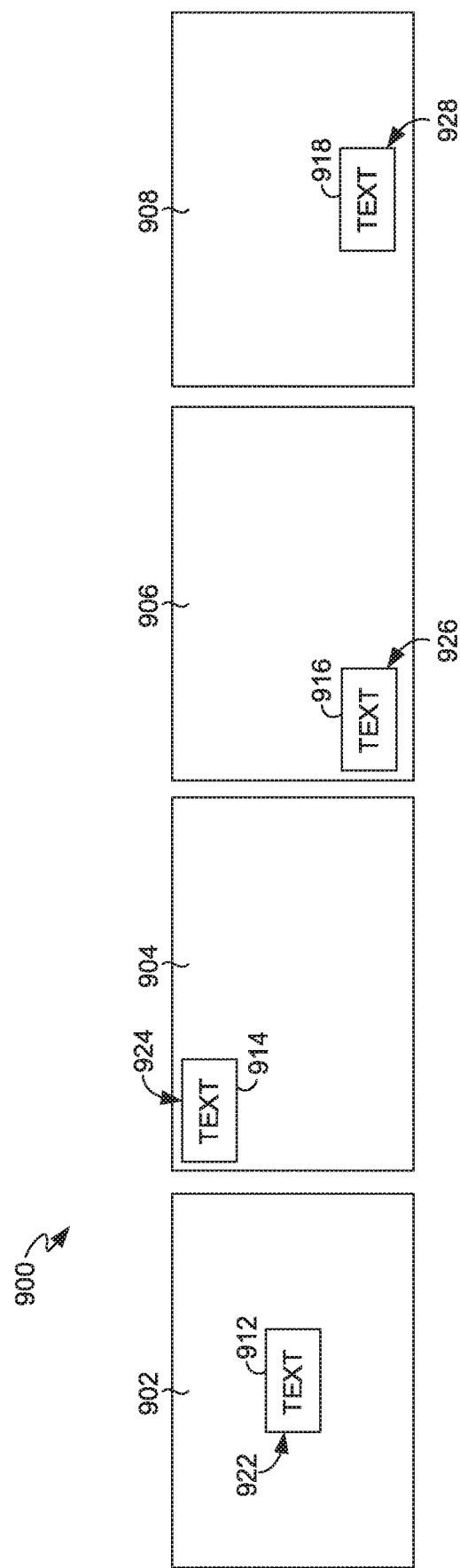
FIG. 9A depicts an example template for display sequences, in accordance with embodiments of the present disclosure.
Figure 9B:
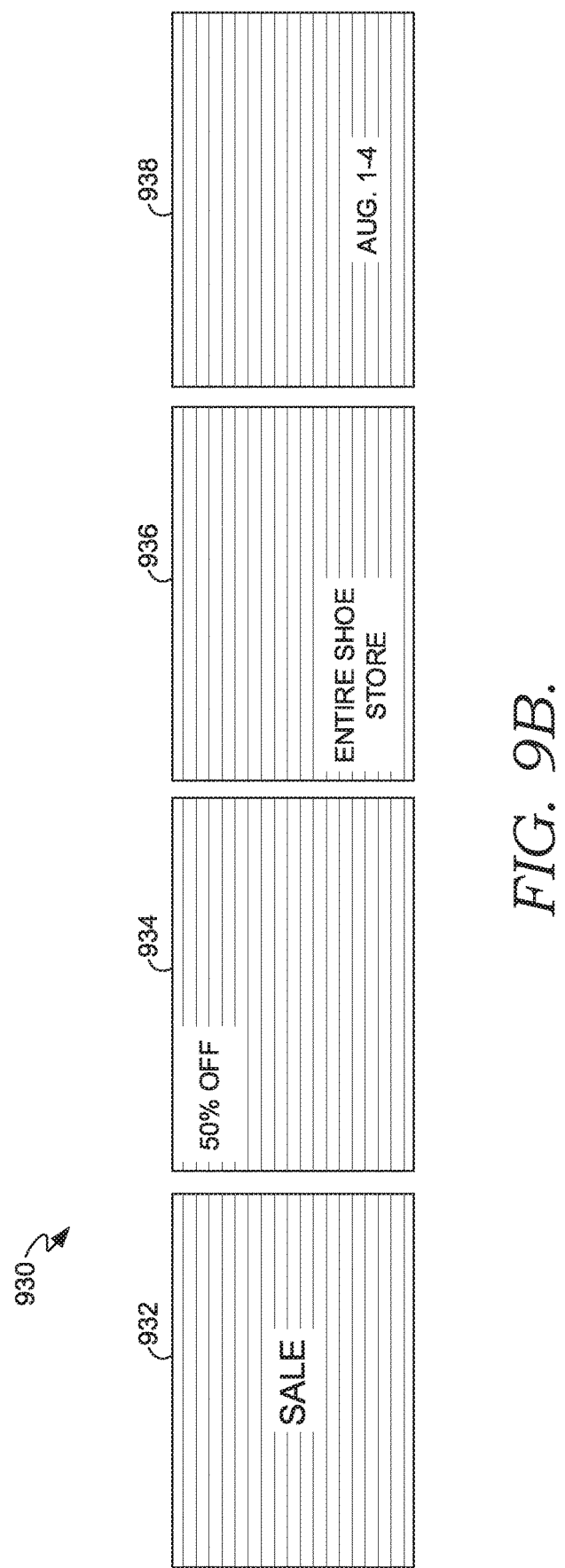
FIGS. 9B and 9C depict example advertisement sequences created with the example template of FIG. 9A, in accordance with embodiments of the present disclosure.
Figure 9C:
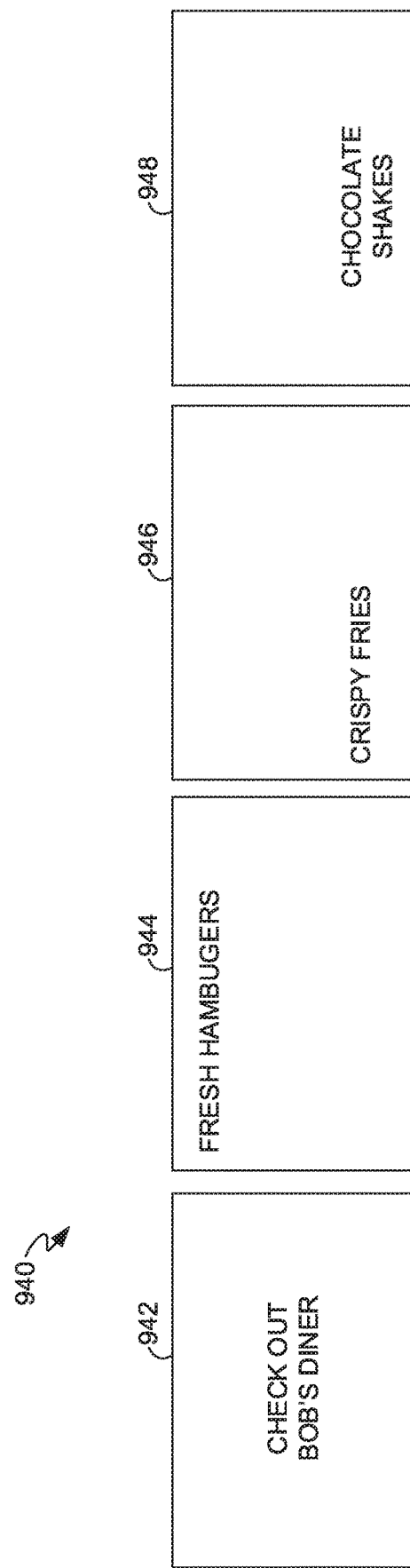

Referring to FIG. 9, an example template sequence 900 is depicted. Template sequence 900 comprises first template frame 902, second template frame 904, third template frame 906, and fourth template frame 908. Each frame includes a text object in a different position within the frame. First text object 912 is within a center position 922 of first frame 902. Second text object 914 is within an upper-left position 924 of second frame 904. Third text object 916 is within a lower-left position 926 of third frame, and fourth text object 918 is within a lower central position 928 of fourth frame 908. Based on the positions 922-928 within template sequence 900, a template baseline, such as a template heat map, may be determined and associated with the template sequence 900.

Template sequence 900 may then be applied to content to create multiple display sequences, such as sequences 930 and 940 in FIGS. 9A and 7B, respectively. Sequence 930 comprises four frames 932, 934, 936, and 938, and sequence 940 similarly comprises four frames 942, 944, 946, and 948. Frames 932-938 in sequence 930 and frames 942-948 in sequence 940 each have a text object with a position corresponding to positions 922-928 of the template sequence. When viewer engagement is tracked during the display of either sequence 930 or sequence 940, viewer engagement may be determined using the template baseline for template sequence 900. For instance, a heat map generated for tracking engagement with sequence 930 and a heat map generated for tracking engagement with sequence 940 may each be compared to a template baseline heat map to classify engagement with each sequence. In this way, a single template may be used to track engagement in multiple advertisements with different content.

Example Flow Diagrams

Figure 10:
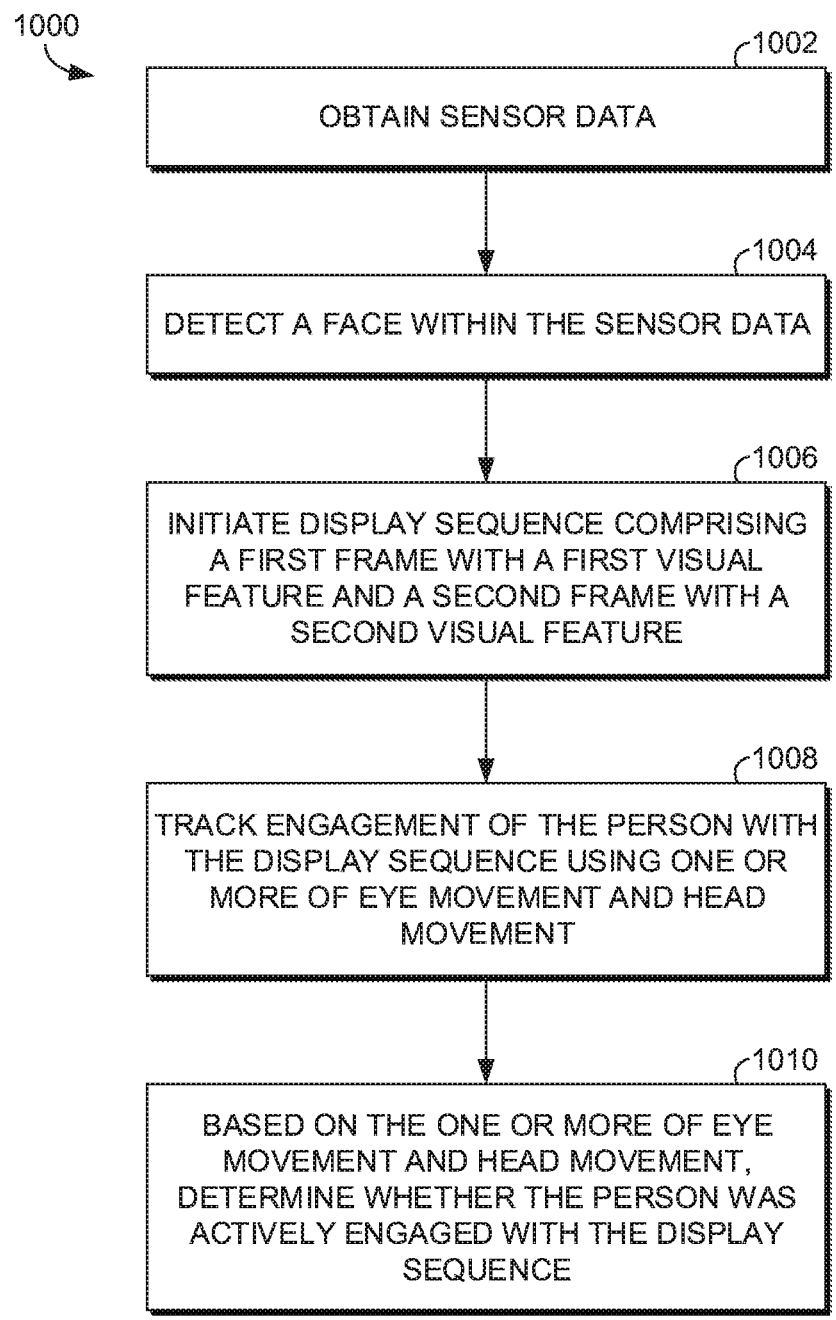
FIG. 10 depicts a flow diagram showing a method for tracking viewer engagement, in accordance with embodiments of the present invention.

With reference to FIG. 10, a flow diagram is provided to show an embodiment of a method 1000 for tracking viewer engagement, in accordance with embodiments of the present invention. Each block of method 1000 and other methods described herein, including methods 1100 and 1200 of FIGS. 11 and 12, comprises a computing process that may be performed using any combination of hardware, firmware, and/or software. For instance, various functions may be carried out by a processor executing instructions stored in memory. The methods may be provided by a standalone application, a service or hosted service (either standalone or in combination with another hosted service), or a plug-in to another product, for example.

Method 1000 may be performed in whole or in part by engagement tracking manager 200 of FIG. 2. Initially, at block 1002, sensor data is obtained. Sensor data may comprise stored video files, a live video feed, video frames, photographs, infrared depth arrays and the like, and may be data captured by one or more sensors connected to or otherwise associated with a display device. The sensor data that is obtained may depict the environment in front of a display device.

At block 1004, at least on person's face is detected in the sensor data. As such, detecting the person's face indicates that a person may have his or her attention directed towards the display device. Face detection may occur as discussed with respect to face detection component 202 of FIG. 2. Once a face is detected, a display sequence is automatically initiated at block 1006. The initiated display sequence includes a first frame with a first visual feature and a second frame with a second visual feature. The visual features may relate to a visual aspect of content within the frames. For instance, the first frame may include a red icon in a first location within the frame, and the second frame may include a pink icon in a second location. In some embodiments, the first frame and the second frame have at least one visual feature in common. In exemplary aspects, initiation of the display sequence is performed by sequence display component 204 of FIG. 2.

At block 1008, the person's engagement with the display sequence is tracked using the person's eye movement and/or head movement. Tracking may be performed using sensor data that is captured during the presentation of the display sequence such that it shows the person being either engaged or not engaged with the display sequence. Eye movement may be tracked using the positions of the person's pupils throughout the sequence, and head movement may be determined by the pitch, yaw, and roll of the person's head during the sequence. In some embodiments, both eye movements and head movements are tracked. Tracking of the person's engagement with the display sequence may be performed by tracking component 206 of FIG. 2.

In some embodiments, tracking engagement includes continuing to determine whether a face is detected. If a face is no longer detected while a sequence is being presented, the display sequence may continue to be presented while the tracking may stop. When tracking stops prior to the end of the display sequence, any tracking data received may be discarded.

When tracking continues through the duration of the display sequence, the data gathered during tracking is used to determine whether the person was actively engaged with the display sequence, at block 1010. This block of method 1000 may be performed by engagement component 208 of FIG. 2. Engagement of the viewer may be determined using a baseline, such as a positive baseline indicating eye and/or head movement associated with active viewer engagement for a particular display sequence. In exemplary aspects, the baseline comprises a representation of eye and/or head movements around a frame over time, such as a heat map. Determining engagement may be performed by comparing a heat map generated for the tracking data with the baseline heat map and comparing the difference to a threshold variance. In alternative embodiments, viewer engagement is determined by inputting the heat map generated for the tracking data into a neural network trained to predict whether a viewer was actively engaged based on heat maps of known engagement samples.

The determination of whether the viewer was actively engaged may be stored in a database, such as database 106. This process may be repeated for multiple viewers, and in some embodiments, may be performed in multiple locations for a particular display sequence. The collective determinations of engagement may be sent to a remote server and used to determine the effectiveness of a particular display sequence. In some embodiments, an effectiveness score for a particular display sequence is computed. The effective scores indicates how well a sequence keeps a viewer engaged and may comprise the percentage of viewers who were actively engaged out of all the viewers who viewed the display sequence. As previously explained, in some embodiments, engagement tracking is stopped during a display sequence if an individual's face is no longer detected in the sensor data and the tracking session is considered incomplete. In these embodiments, incomplete tracking sessions may not be considered when determining an effectiveness score for a display sequence.

Method 1000 may also be performed for multiple display sequences, and an effectiveness score may be computed for each sequence. The effectiveness scores for similar sequences, such as different sequences in an advertisement campaign, may be compared to determine how to tailor sequences to increase effectiveness of an overall campaign.

Figure 11:
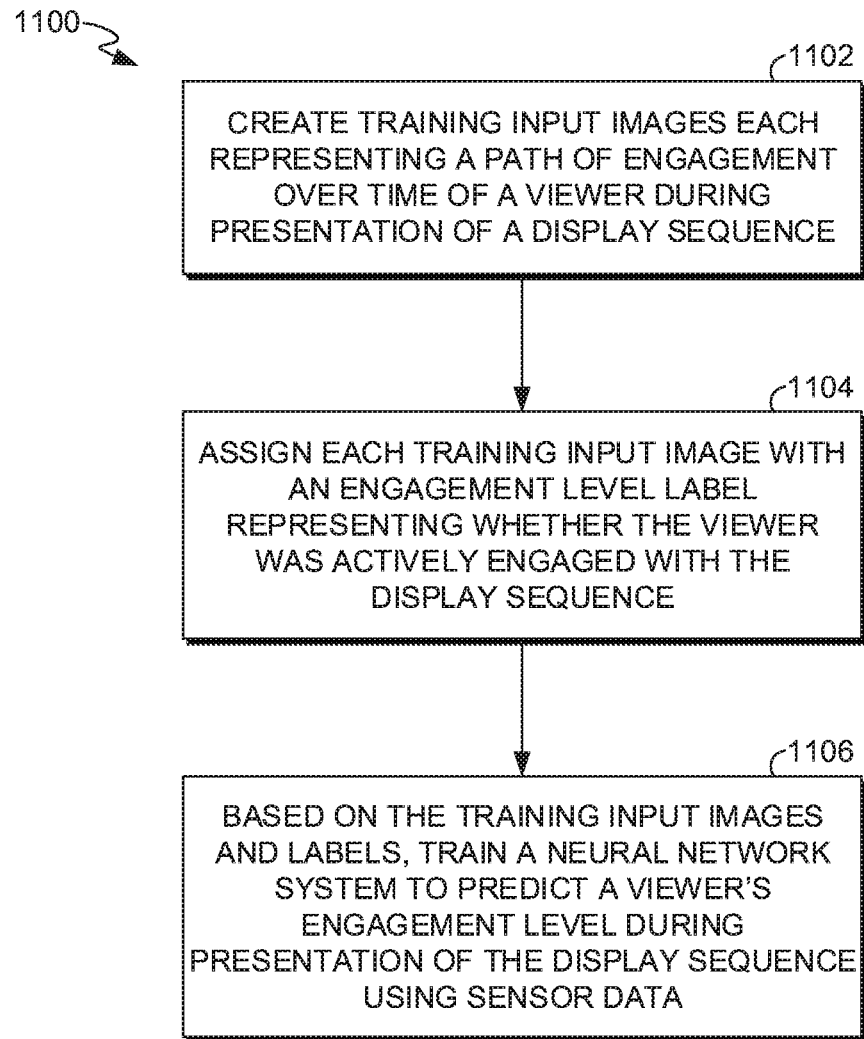
FIG. 11 depicts a flow diagram showing a method for training a neural network to track viewer engagement, in accordance with embodiments of the present disclosure.

FIG. 11 depicts a block diagrams illustrating an example method 1100 for training a neural network, such as neural network system 712 in FIG. 7, to predict viewer engagement with a display sequence. Method 1100 may be performed, for example, by training engine 702 of engagement tracking manager as discussed with respect to FIG. 7.

At block 1102, a plurality of training input images are created. Each training input image is created from sensor data, such as images, capturing a viewer during presentation of a display sequence. Each training input image that is created represents a path of engagement over time for a particular viewer during the display sequence.

In exemplary aspects, creating a particular training input image comprises receiving the sensor data, such as a plurality of captured images, captured over time during the presentation of the display sequence. Each captured image may be associated with a time stamp. For each captured image, an engaged portion is identified. The engaged portion is an area of a display that presented the display sequence to which viewer's attention was directed during a particular time within the sequence. For example, the engaged portion may represent an area to which a viewer's eyes were directed or head was directed during the sequence. The engaged portions from at least some of the captured images are aggregated to form the training input image such that each engaged portion corresponds to a pixel or group of pixels within the training input image.

Further, in exemplary aspects, a pixel value is assigned to pixels within each engaged portion based on a time stamp associated with the engaged portion. The pixel value may comprise an intensity value, and the training input image consequently comprises a grayscale image with a line representing the path of engagement of the viewer during the display sequence. The path of engagement (the line) here comprises the aggregated engaged portions.

After the training input images are created, each training input image is assigned an engagement level label at block 1104. The engagement level label represents whether a viewer was actively engaged with the display sequence. In some embodiments, the engagement label is either active engagement or non-active engagement.

At block 1106, a neural network is trained to predict a viewer's engagement during presentation of the display sequence. The neural network is trained using the training input images and the assigned engagement level labels. The neural network may comprise a convolution neural network with multiple convolution blocks and at least one fully-connected classifier layer. Each training input image is input in the neural network system to determine whether the viewer captured in the sensor data that was used to create the training input image was actively engaged with the display sequence. This determination may be made by determining a probability that the viewer was actively engaged and/or determining a probability that the viewer was not actively engaged. The determined probability may be compared to a threshold probability to classify the training input image was active engagement or non-active engagement. This training output of the neural network is compared to the engagement reference label assigned to the particular training input image. Based on errors determined from these comparisons, the neural network is adjusted to increase accuracy for future iterations. Once the neural network is trained to predict viewer engagement at a minimum accuracy level, the unlabeled images may be input into the neural network to predict viewer engagement where viewer engagement is not previously known. As such, the trained neural network may be used in conjunction with method 1000 of FIG. 10.

Figure 12:
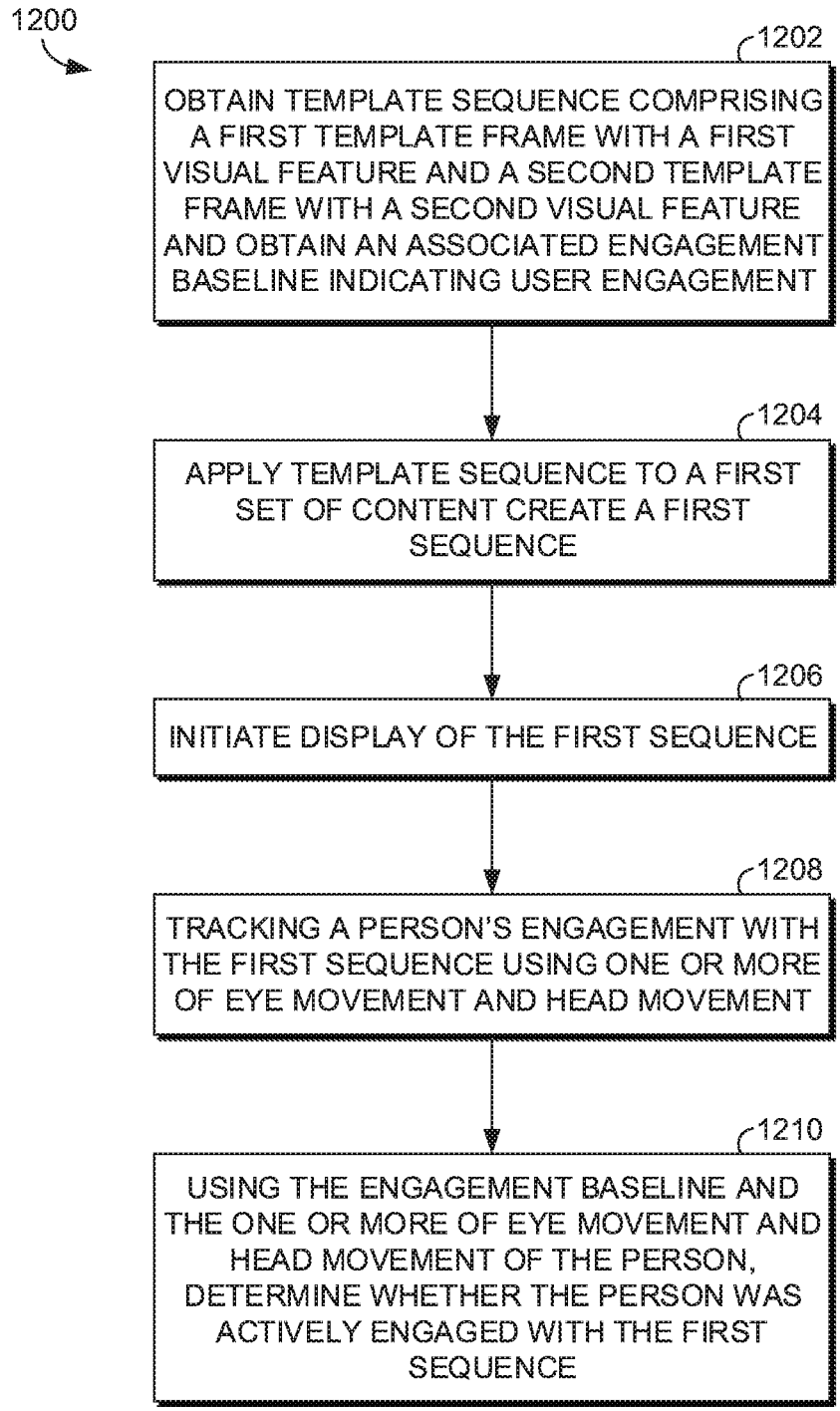
FIG. 12 depicts a flow diagram showing a method for using a template for display sequences to track viewer engagement.

FIG. 12 depicts a block diagram illustrating an example method 1200 for utilizing a template for tracking engagement. Method 1200 may be performed, for example, by one or more components of the engagement tracking manager 200 of FIG. 2. At block 1202, a template sequence is obtained. The template sequence comprises a series of frames with at least one different visual feature. For instance, the template sequence may include at least a first template frame with a first visual feature and a second template frame with a second visual feature. An example template sequence 900 is described further with respect to FIG. 7. The template sequence is associated with an engagement baseline that indicates viewer engagement for the sequence. The baseline may be based on the changes in the visual features within the sequence such that the viewer engagement follows changes in visual features between the frames of the template sequence.

Method 1200 may be performed locally by a display device or may be performed by a remote server that is accessible, either directly or indirectly, by multiple display devices. As such, the template sequence and associated baseline may be obtained by a display device from a remote component, such as a remote server, or may be obtained by creating the template sequence and baseline. Obtaining the template sequence and associated baseline may be performed by template component 210 of FIG. 2.

At block 1204, the template sequence is applied to a first set of content. The first set of content may be content that collectively forms an advertisement and may comprise text, pictures, video, audio, and the like. When the template is applied to the first set of content, a first sequence is created that includes the first set of content within the format provided by the template sequence. For instance, similar to the template sequence, the first sequence may comprise a first frame with the first visual feature and a second frame with the second visual feature. In particular, the first sequence may comprise a first text with the first visual feature on the first frame and a second text with the second visual feature on the second frame. At block 1206, presentation of the first sequence on a display device may be initiated, and at block 1208, a person's engagement in the first sequence may be tracked. Blocks 1206 and 1208 may be performed in a similar manner as described above with respect to method 1000. For instance, tracking the person's engagement may include using sensor data, such as image data, captured during the display sequence to track the person's eye movements and/or head movements. At block 1210, the engagement baseline associated with the template is used along with the tracking data to determine whether the person was actively engaged with the first sequence.

The same template sequence may be similarly applied to a second set of content for a second advertisement to create a second sequence. Like the first sequence, the second sequence may also include a first frame having a first text with the first visual feature and a second frame having a second text with the second visual feature. The first and second texts of the second sequence may have different content than the first and second texts of the first sequence, but the texts share the first and second visual features, such as position within a frame, color, or font size. Accordingly, the first and second sequences may convey different content with a similar format that is determined by the template sequence.

Similar to the first sequence, the second sequence may be displayed on a display device. The second sequence may be displayed on the same or different display device as the first sequence. A person's engagement in the second sequence may be tracked using the person's eye movements and/or head movements. The person's whose engagement is tracked may be the same or different person who viewed the first sequence. After the display of the second sequence and tracking is complete, the engagement baseline associated with the template sequence may be used with the tracking data for the second sequence to determine whether the person was actively engaged with the second sequence. In this way, the same engagement baseline that is associated with the template sequence may be used to determine engagement in different sequences.

Example Operating Environment

Figure 13:
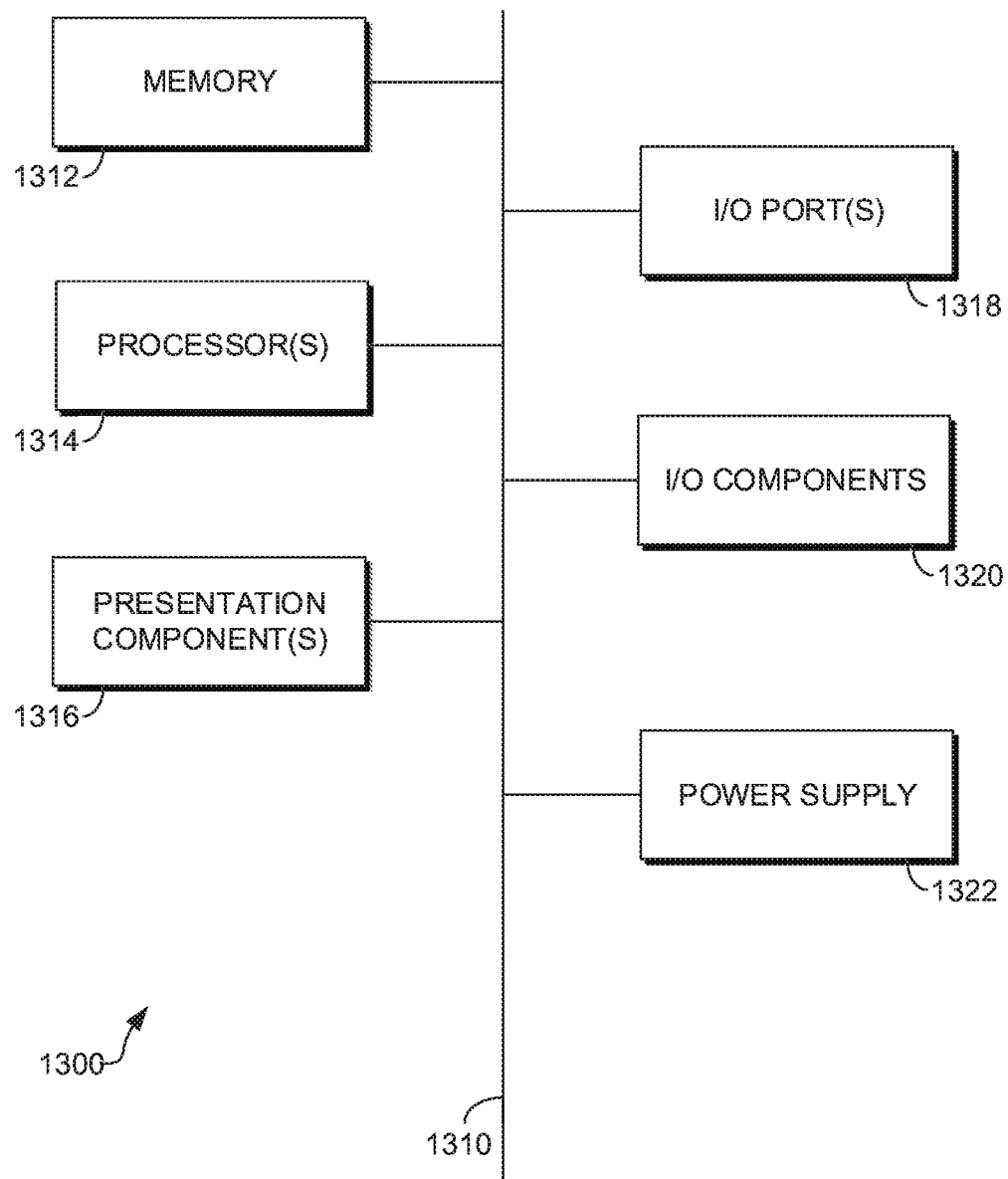
FIG. 13 is a block diagram of an example operating device in which embodiments of the present disclosure may be employed.

Having described an overview of embodiments of the present invention, an exemplary operating environment in which embodiments of the present invention may be implemented is described below in order to provide a general context for various aspects of the present invention. Referring now to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output (I/O) ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc. The I/O components 1320 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. A computer-implemented method for training a neural network system to predict viewer engagement with a display sequence, the method comprising:
   creating a plurality of training input images, wherein each training input image represents a path of engagement over time for a viewer during presentation of a display sequence;

assigning each training input image with an engagement level label representing whether the viewer was actively engaged with the display sequence; and based on the plurality of training input images and engagement level labels, training a neural network system to predict an engagement level of another viewer during presentation of the display sequence using sensor data captured during presentations of the display sequence.

2. The computer-implemented method of claim 1, wherein each training input image within the plurality of training input images is created by:

receiving a plurality of captured images captured over time during presentation of the display sequence, wherein each captured image is associated with a time stamp;

for each captured image, identifying an engaged portion of a display presenting the display sequence, wherein the engaged portion comprises an area of the display to which the viewer's eyes or head is directed; and aggregating the engaged portions identified from at least a portion of the plurality of captured images to create the training input image.

3. The computer-implemented method of claim 2, wherein creating the training input image further comprises assigning a pixel value to pixels within each engaged portion, wherein the pixel value is assigned based on a time stamp associated with a captured image from which a particular engaged portion was identified.

4. The computer-implemented method of claim 2, wherein the training input image comprises a grayscale image, and wherein the engaged portions are aggregated to form a line representing the path of engagement of the viewer during the display sequence.

5. The computer-implemented method of claim 2, wherein identifying the engaged portion of a display comprises determining a pupil position of the viewer for each captured image.

6. The computer-implemented method of claim 2, wherein identifying the engaged portion of a display comprises determining a head position of the viewer for each captured image.

7. The computer-implemented method of claim 1, wherein pixels representing the path of engagement in each training input image correspond to engaged portions of the display sequence, and wherein intensity values of pixels forming the path of engagement in each training input image correspond to relative times when the viewer is engaged with the engaged portions.

8. The computer-implemented method of claim 1, wherein the display sequence comprises a plurality of frames with each frame having at least one visual feature that is different from other frames, and wherein the training input image comprises dimensions that are scaled to dimensions of each frame within the display sequence.

9. A computerized system comprising:
one or more data stores;
a training image component configured to:
  create a plurality of training input images, wherein each training input image represents a path of engagement over time for a viewer during presentation of a display sequence; and
  assign each training input image with an engagement level label representing whether the viewer was actively engaged with the display sequence; and
a training component configured to, based on the plurality of training input images and engagement level labels, train a neural network system to predict an engagement level of another viewer during presentation of the display sequence using sensor data captured during presentations of the display sequence.

10. The computerized system of claim 9, wherein the training image component is configured to create each training input image within the plurality of training input images by:

receiving a plurality of captured images captured over time during presentation of the display sequence, wherein each captured image is associated with a time stamp;

for each captured image, identifying an engaged portion of a display presenting the display sequence, wherein the engaged portion comprises an area of the display to which the viewer's eyes or head is directed; and aggregating the engaged portions identified from at least a portion of the plurality of captured images to create the training input image.

11. The computerized system of claim 10, wherein creating the training input image further comprises assigning a pixel value to pixels within each engaged portion, wherein the pixel value is assigned based on a time stamp associated with a captured image from which a particular engaged portion was identified.

12. The computerized system of claim 10, wherein the training input image comprises a grayscale image, and the engaged portions are aggregated to form a line representing the path of engagement of the viewer during the display sequence.

13. The computerized system of claim 12, wherein each pixel forming the line representing the path of engagement is assigned an intensity value based on a time stamp associated with a captured image from which a particular engaged portion was identified, and wherein the line comprises a gradient grayscale line.

14. The computerized system of claim 10, wherein the plurality of captured images are captured by at least one camera.

15. The computerized system of claim 9, wherein the neural network system is trained to predict an engagement level based on one or more of pupil movement and head movement of the another viewer.

16. One or more computer-storage media having a plurality of executable instructions embodied thereon that, when executed by one or more processors, cause the one or more processors to perform a method comprising:

creating a plurality of training input images, wherein each training input image represents a path of engagement over time for a viewer during presentation of a display sequence;

assigning each training input image with an engagement level label representing whether the viewer was actively engaged with the display sequence; and based on the plurality of training input images and engagement level labels, training a neural network system to predict an engagement level of another viewer during presentation of the display sequence using sensor data captured during presentations of the display sequence.

17. The computer-storage media of claim 16, wherein each training input image within the plurality of training input images is created by:

receiving a plurality of captured images captured over time during presentation of the display sequence, wherein each captured image is associated with a time stamp;

for each captured image, identifying an engaged portion of a display presenting the display sequence, wherein the engaged portion comprises an area of the display to which the viewer's eyes or head is directed; and aggregating the engaged portions identified from at least a portion of the plurality of captured images to create the training input image.

18. The computer-storage media of claim 17, wherein creating the training input image further comprises assigning a pixel value to pixels within each engaged portion, wherein the pixel value is assigned based on a time stamp associated with a captured image from which a particular engaged portion was identified.

19. The computer-storage media of claim 17, wherein the plurality of captured images are captured by at least two cameras.

20. The computer-storage media of claim 17, wherein the neural network system is trained to predict an engagement level based on one or more of pupil movement and head movement of the another viewer.

* * * * *